US012561376B2

(12) United States Patent
Samdani et al.

(10) Patent No.: US 12,561,376 B2
(45) Date of Patent: Feb. 24, 2026

(54) PERSONALIZED SEARCH BASED ON ACCOUNT ATTRIBUTES

(71) Applicant: OKTA, INC., San Francisco, CA (US)

(72) Inventors: Rajhans Samdani, Belmont, CA (US); Ankit Goyal, Daly City, CA (US); Pierre Rappolt, San Francisco, CA (US); Emily Yidan Wang, San Francisco, CA (US); Pratyus Patnaik, Los Altos, CA (US); William S. Potter, San Francisco, CA (US); Suchit Agarwal, Jersey City, NJ (US)

(73) Assignee: Okta, Inc., San Francisco, CA (US)

( * ) Notice: Subject to any disclaimer, the term of this patent is extended or adjusted under 35 U.S.C. 154(b) by 234 days.

(21) Appl. No.: 17/987,689

(22) Filed: Nov. 15, 2022

(65) Prior Publication Data

US 2023/0095077 A1    Mar. 30, 2023

Related U.S. Application Data

(63) Continuation of application No. 16/584,742, filed on Sep. 26, 2019, now Pat. No. 11,531,707.

(51) Int. Cl.
*G06F 16/9032* (2019.01)
*G06F 16/903* (2019.01)
(Continued)

(52) U.S. Cl.
CPC .. *G06F 16/90332* (2019.01); *G06F 16/90344* (2019.01); *G06F 16/9035* (2019.01); *G06F 16/908* (2019.01); *G06F 16/909* (2019.01)

(58) Field of Classification Search
CPC ......... G06F 16/90332; G06F 16/90344; G06F 16/9035; G06F 16/908; G06F 16/909; G06F 16/335
See application file for complete search history.

(56) References Cited

U.S. PATENT DOCUMENTS 5,634,051 A    5/1997  Thomson
5,659,732 A    8/1997  Kirsch
(Continued)

FOREIGN PATENT DOCUMENTS

AU    2014286166 B2    2/2017

OTHER PUBLICATIONS

Faed, A. "Handling e-complaints in customer complaint management system using FMEA as a qualitative system," 6th International Conference on Advanced Information Management and Service, Nov. 30-Dec. 2, 2010, pp. 205-209.

*Primary Examiner* — Pierre Vital
*Assistant Examiner* — Zuheir A Mheir
(74) *Attorney, Agent, or Firm* — Holland & Hart LLP

(57) ABSTRACT
A system stores resources such as text articles, videos, and so forth for an organization. During operation, the system receives a query and provides a response. During initial use of the system, there is little or no historical data available to help determine which resource is most relevant to a particular query. In this "cold-start" situation, the system determines attributes associated with a user account of the user making the query. The query is used to search a data store and retrieve a set of resources based on a term match with the query and to find the resources which correspond to the attributes of the user account. This allows the system to provide simplified output that is more likely to be relevant to that particular user in the "cold-start" situation.

20 Claims, 18 Drawing Sheets

(51) Int. Cl.
    *G06F 16/9035*     (2019.01)
    *G06F 16/908*     (2019.01)
    *G06F 16/909*     (2019.01)

(56)       References Cited

U.S. PATENT DOCUMENTS

| | | | |
|---|---|---|---|
| 5,966,126 A | 10/1999 | Szabo | |
| 6,026,388 A | 2/2000 | Liddy et al. | |
| 6,385,329 B1 | 5/2002 | Sharma et al. | |
| 6,865,571 B2 * | 3/2005 | Inaba | G06F 16/335 |
| | | | 707/999.005 |
| 7,181,438 B1 | 2/2007 | Szabo | |
| 7,801,896 B2 | 9/2010 | Szabo | |
| 7,827,125 B1 * | 11/2010 | Rennison | G06F 16/906 |
| | | | 706/14 |
| 8,886,587 B1 | 11/2014 | Hainsworth et al. | |
| 9,245,271 B1 | 1/2016 | Ahmed et al. | |
| 9,654,640 B1 | 5/2017 | Brydon et al. | |
| 10,388,274 B1 | 8/2019 | Hoffmeister | |
| 10,497,039 B1 * | 12/2019 | Singh | G06F 16/248 |
| 10,565,181 B1 | 2/2020 | Hjermstad et al. | |
| 10,567,235 B1 * | 2/2020 | Shah | H04L 41/0654 |
| 10,685,047 B1 | 6/2020 | Patnaik et al. | |
| 10,795,886 B1 | 10/2020 | Samdani et al. | |
| 10,817,483 B1 | 10/2020 | Samdani et al. | |
| 11,328,019 B2 * | 5/2022 | Bonin | G06F 40/30 |
| 11,468,105 B1 | 10/2022 | Patnaik et al. | |
| 11,531,707 B1 | 12/2022 | Samdani et al. | |
| 11,544,334 B2 * | 1/2023 | Gottumukkala | G06F 16/9532 |
| 11,803,556 B1 * | 10/2023 | Samdani | G06F 16/24578 |
| 2002/0107842 A1 * | 8/2002 | Biebesheimer | G06F 16/951 |
| 2004/0072143 A1 | 4/2004 | Timmis et al. | |
| 2004/0243568 A1 | 12/2004 | Wang et al. | |
| 2005/0086046 A1 | 4/2005 | Bennett | |
| 2005/0094848 A1 | 5/2005 | Carr et al. | |
| 2006/0160065 A1 | 7/2006 | Timmis et al. | |
| 2008/0052056 A1 | 2/2008 | Timmis et al. | |
| 2008/0071769 A1 | 3/2008 | Jagannathan | |
| 2008/0077570 A1 | 3/2008 | Tang et al. | |
| 2008/0235283 A1 | 9/2008 | Turnball et al. | |
| 2009/0006360 A1 * | 1/2009 | Liao | G06F 16/284 |
| | | | 707/999.005 |
| 2009/0182609 A1 | 7/2009 | Kelleher | |
| 2010/0005081 A1 | 1/2010 | Bennett | |
| 2010/0070554 A1 | 3/2010 | Richardson et al. | |
| 2010/0076998 A1 | 3/2010 | Podgorny et al. | |
| 2010/0094878 A1 | 4/2010 | Soroca et al. | |
| 2010/0115040 A1 * | 5/2010 | Sargent | H04L 51/42 |
| | | | 709/206 |
| 2010/0332583 A1 | 12/2010 | Szabo | |
| 2011/0004588 A1 | 1/2011 | Leitersdorf et al. | |
| 2011/0047163 A1 | 2/2011 | Chechik et al. | |
| 2011/0258049 A1 | 10/2011 | Ramer et al. | |
| 2012/0041937 A1 * | 2/2012 | Dhillon | G06F 16/36 |
| | | | 707/E17.03 |
| 2012/0078890 A1 | 3/2012 | Fan et al. | |
| 2013/0007037 A1 | 1/2013 | Azzam et al. | |
| 2013/0212096 A1 | 8/2013 | Ben Shahar | |
| 2013/0282594 A1 | 10/2013 | Gaedcke et al. | |
| 2014/0040181 A1 | 2/2014 | Vsevolod | |
| 2014/0040246 A1 | 2/2014 | Rubinstein et al. | |
| 2014/0120513 A1 | 5/2014 | Jenkins et al. | |
| 2014/0149411 A1 | 5/2014 | Anand et al. | |
| 2014/0172882 A1 | 6/2014 | Clark et al. | |
| 2015/0120718 A1 | 4/2015 | Luo et al. | |
| 2015/0172294 A1 | 6/2015 | Bittner et al. | |
| 2015/0294246 A1 | 10/2015 | Guven et al. | |
| 2016/0019280 A1 | 1/2016 | Unger et al. | |
| 2016/0034457 A1 | 2/2016 | Bradley et al. | |
| 2016/0063118 A1 | 3/2016 | Campbell et al. | |
| 2016/0171373 A1 | 6/2016 | Allen et al. | |
| 2016/0180726 A1 | 6/2016 | Ahuja et al. | |
| 2016/0188575 A1 | 6/2016 | Sawaf | |
| 2016/0203215 A1 | 7/2016 | Allen et al. | |
| 2016/0335554 A1 | 11/2016 | Koll et al. | |
| 2017/0004204 A1 | 1/2017 | Bastide et al. | |
| 2017/0228372 A1 | 8/2017 | Moreno et al. | |
| 2017/0235792 A1 * | 8/2017 | Mawji | G06F 16/29 |
| | | | 707/769 |
| 2017/0242899 A1 | 8/2017 | Jolley et al. | |
| 2017/0243107 A1 | 8/2017 | Jolley et al. | |
| 2017/0249566 A1 | 8/2017 | Mandel et al. | |
| 2017/0337264 A1 * | 11/2017 | Barbosa | G06F 9/453 |
| 2018/0144064 A1 * | 5/2018 | Krasadakis | G06F 16/90332 |
| 2018/0173698 A1 | 6/2018 | Dubey et al. | |
| 2018/0196822 A1 | 7/2018 | Lewin-Eytan et al. | |
| 2018/0212904 A1 | 7/2018 | Smullen et al. | |
| 2018/0227190 A1 | 8/2018 | Healing et al. | |
| 2018/0285423 A1 | 10/2018 | Ciano et al. | |
| 2019/0108486 A1 | 4/2019 | Jain et al. | |
| 2019/0130049 A1 * | 5/2019 | Jussila | G06F 16/90335 |
| 2019/0155916 A1 | 5/2019 | Huang et al. | |
| 2021/0157860 A1 * | 5/2021 | Li | G06F 16/9035 |
| 2021/0256066 A1 * | 8/2021 | Srinivasan | G06F 9/5027 |
| 2022/0365954 A1 | 11/2022 | Patnaik et al. | |
| 2024/0168982 A1 | 5/2024 | Patnaik et al. | |

\* cited by examiner

100
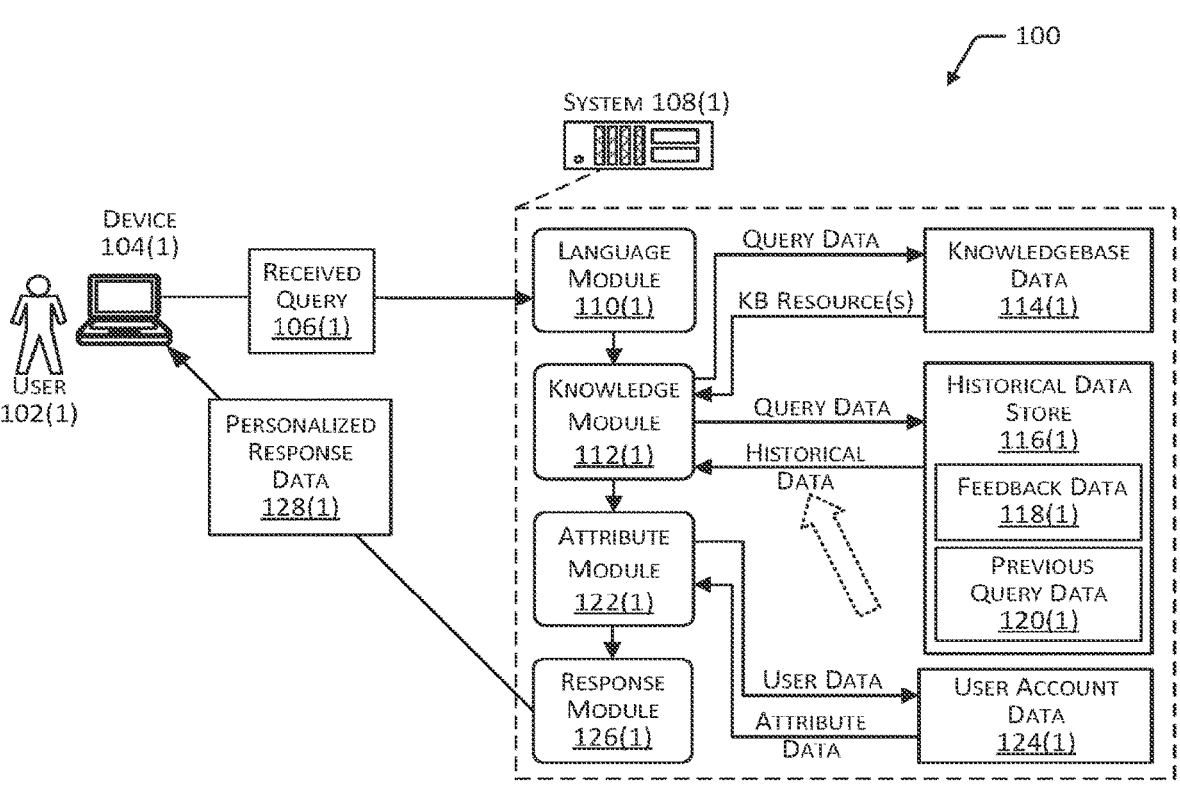
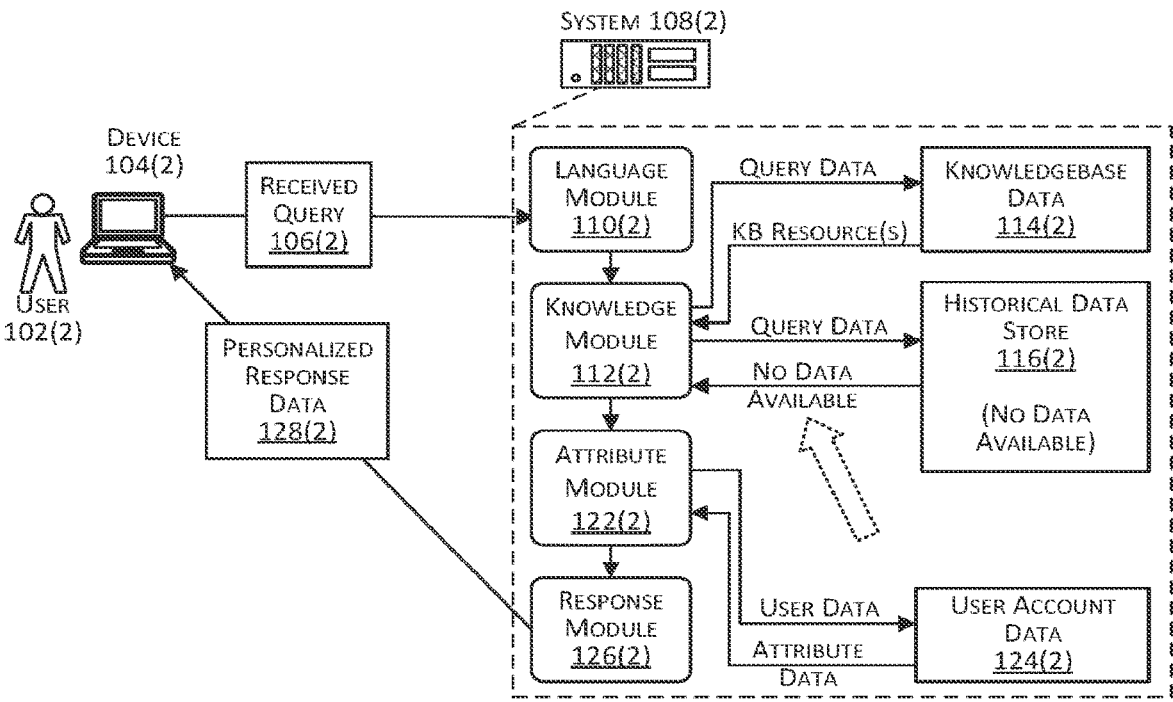
FIG. 1

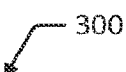

300

```
┌─────────────────────────────────────────────────────────────────┐
│         RECEIVE A QUERY AT A FIRST DEVICE FROM A SECOND DEVICE     │
│                              302                                   │
└─────────────────────────────────────────────────────────────────┘
                                 │
                                 ▼
┌─────────────────────────────────────────────────────────────────┐
│  DETERMINE A SET OF RESOURCES FROM A DATA STORE BASED ON THE QUERY,│
│  THE SET OF RESOURCES INCLUDES A FIRST RESOURCE WITH A FIRST       │
│  RESOURCE ATTRIBUTE VALUE AND A SECOND RESOURCE WITH A SECOND      │
│              RESOURCE ATTRIBUTE VALUE                              │
│                              304                                   │
└─────────────────────────────────────────────────────────────────┘
                                 │
                                 ▼
┌─────────────────────────────────────────────────────────────────┐
│         DETERMINE RELEVANCY SCORES FOR THE SET OF RESOURCES        │
│                              306                                   │
└─────────────────────────────────────────────────────────────────┘
                                 │
                                 ▼
┌─────────────────────────────────────────────────────────────────┐
│  DETERMINE AN ATTRIBUTE VALUE ASSOCIATED WITH A USER ACCOUNT BASED │
│                        ON THE QUERY                                │
│                              308                                   │
└─────────────────────────────────────────────────────────────────┘
                                 │
                                 ▼
┌─────────────────────────────────────────────────────────────────┐
│  DETERMINE A CORRESPONDENCE BETWEEN THE ATTRIBUTE VALUE OF THE USER│
│  ACCOUNT AND RESOURCE ATTRIBUTE VALUES OF THE SET OF RESOURCES     │
│                              310                                   │
└─────────────────────────────────────────────────────────────────┘
                                 │
                                 ▼
┌─────────────────────────────────────────────────────────────────┐
│ DETERMINE A SUBSET OF THE SET OF RESOURCES BASED ON THE CORRESPONDENCE │
│                              312                                   │
└─────────────────────────────────────────────────────────────────┘
                                 │
                                 ▼
┌─────────────────────────────────────────────────────────────────┐
│  DETERMINE A RESOURCE OF THE SUBSET HAVING A HIGHEST RELEVANCY SCORE │
│                              314                                   │
└─────────────────────────────────────────────────────────────────┘
                                 │
                                 ▼
┌─────────────────────────────────────────────────────────────────┐
│  PROVIDE RESPONSE DATA INCLUDING THE RESOURCE TO THE SECOND DEVICE │
│                              316                                   │
└─────────────────────────────────────────────────────────────────┘
```

FIG. 3

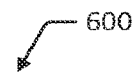

COMPUTING DEVICE
602
(E.G., SERVER 108)

POWER SUPPLY
604

COMMUNICATION
INTERFACE(S) 610

I/O INTERFACE(S)
612

I/O DEVICE(S)
616

PROCESSOR(S)
606

NETWORK
INTERFACE(S) 614

CLOCK(S)
608

MEMORY 618

OPERATING SYSTEM MODULE 620

COMMUNICATION MODULE 622

GUI MODULE 624

LANGUAGE MODULE 110

KNOWLEDGE MODULE 112

QUERY MODULE 208

RELEVANCY SCORING MODULE 218

ATTRIBUTE MODULE 122

USER ACCOUNT QUERY MODULE
220

ATTRIBUTE MATCH MODULE 226

RESPONSE MODULE 126

MACHINE LEARNING MODULE(S) 626

OTHER MODULE(S) 628

DATA STORE 630

LANGUAGE DATA 204

KNOWLEDGEBASE RESOURCE DATA 114

HISTORICAL DATA 116

PREVIOUS QUERY DATA 120

FEEDBACK DATA 118

EVENT DATA 232

USER ACCOUNT DATA 134

OTHER DATA 632

FIG. 6

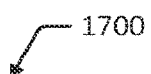

1700

RECEIVE THE SAME QUERY FROM A FIRST DEVICE AND A SECOND DEVICE
1702

DETERMINE A SET OF RESOURCES FROM A DATA STORE BASED ON THE QUERIES
1704

DETERMINE A FIRST USER ACCOUNT ATTRIBUTE ASSOCIATED WITH THE FIRST
DEVICE AND A SECOND USER ACCOUNT ATTRIBUTE ASSOCIATED WITH THE SECOND
DEVICE
1706

DETERMINE A FIRST RESOURCE FROM THE SET OF RESOURCES BASED ON A
CORRESPONDENCE BETWEEN A FIRST RESOURCE ATTRIBUTE AND THE FIRST USER
ACCOUNT ATTRIBUTE
1708

PROVIDE THE FIRST RESOURCE TO THE FIRST DEVICE
1710

DETERMINE A SECOND RESOURCE FROM THE SET OF RESOURCES BASED ON A
CORRESPONDENCE BETWEEN A SECOND RESOURCE ATTRIBUTE AND THE SECOND
USER ACCOUNT ATTRIBUTE
1712

PROVIDE THE SECOND RESOURCE TO THE SECOND DEVICE
1714

FIG. 17

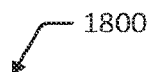

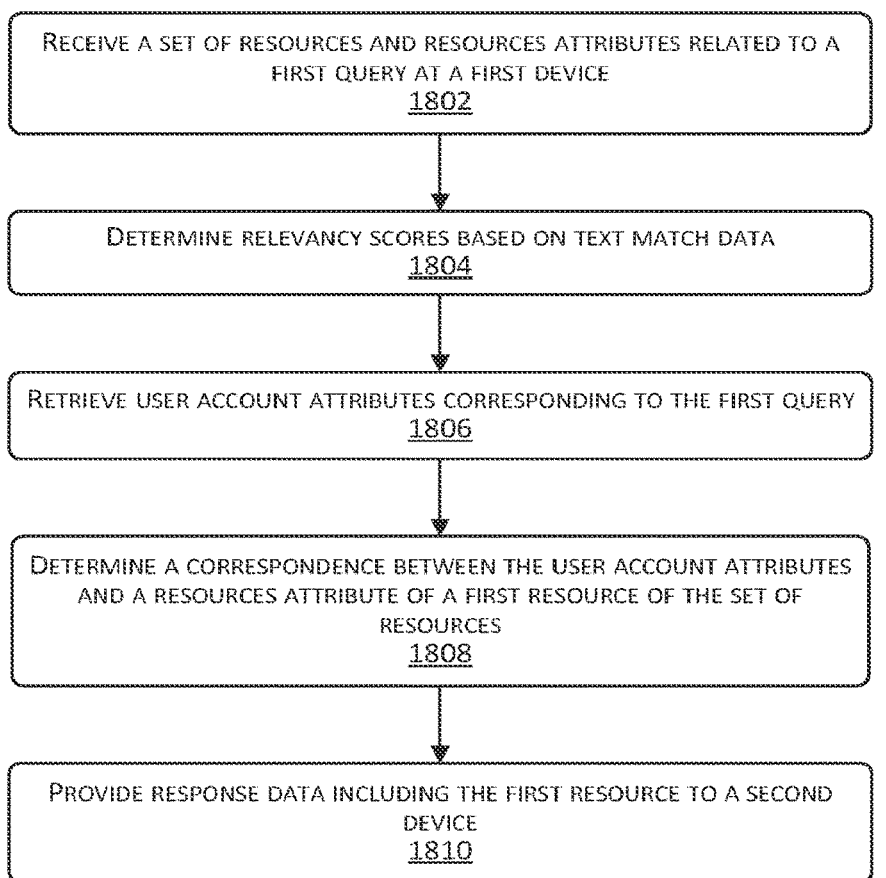

RECEIVE A SET OF RESOURCES AND RESOURCES ATTRIBUTES RELATED TO A
FIRST QUERY AT A FIRST DEVICE
1802

DETERMINE RELEVANCY SCORES BASED ON TEXT MATCH DATA
1804

RETRIEVE USER ACCOUNT ATTRIBUTES CORRESPONDING TO THE FIRST QUERY
1806

DETERMINE A CORRESPONDENCE BETWEEN THE USER ACCOUNT ATTRIBUTES
AND A RESOURCES ATTRIBUTE OF A FIRST RESOURCE OF THE SET OF
RESOURCES
1808

PROVIDE RESPONSE DATA INCLUDING THE FIRST RESOURCE TO A SECOND
DEVICE
1810

FIG. 18

PERSONALIZED SEARCH BASED ON ACCOUNT ATTRIBUTES

INCORPORATION BY REFERENCE

This application is a continuation of U.S. patent application Ser. No. 16/584,742, filed on Sep. 26, 2019, which is hereby incorporated by reference.

The contents of U.S. patent application Ser. No. 15/373,312 filed on Dec. 8, 2016, titled "Request Processing System" are incorporated by reference into the present disclosure.

The contents of U.S. patent application Ser. No. 15/610,183 filed on May 31, 2017, titled "System for Determining and Modifying Deprecated Data Entries" are incorporated by reference into the present disclosure.

The contents of U.S. patent application Ser. No. 15/942,342 filed on Mar. 30, 2018, titled "Dynamic Query Routing System" are incorporated by reference into the present disclosure.

The contents of U.S. patent application Ser. No. 16/521,244 filed on Jul. 24, 2019, titled "System for Handling Workplace Queries Using Online Learning to Rank" are incorporated herein by reference into the present disclosure.

BACKGROUND

Individuals within companies or other organizations may submit requests for information or services. The requests may be processed by a variety of systems.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 depicts a block diagram of a system for determining a resource from a data store that is personalized to the user based on attribute data, according to some implementations.

FIG. 3 depicts a flow diagram of a method of determining a resource that is personalized to the user based on attribute data, according to one implementation.

FIG. 6 depicts a block diagram of a computing device to determine a resource from a data store that is personalized to the user based on attribute data, according to some implementations.

FIG. 17 depicts a flow diagram of a method of determining a resource from a data store that is personalized to the user based on attribute data, according to one implementation.

FIG. 18 depicts a flow diagram of a method of determining a resource from a data store that is personalized to the user based on attribute data, according to one implementation.

Figure 2:
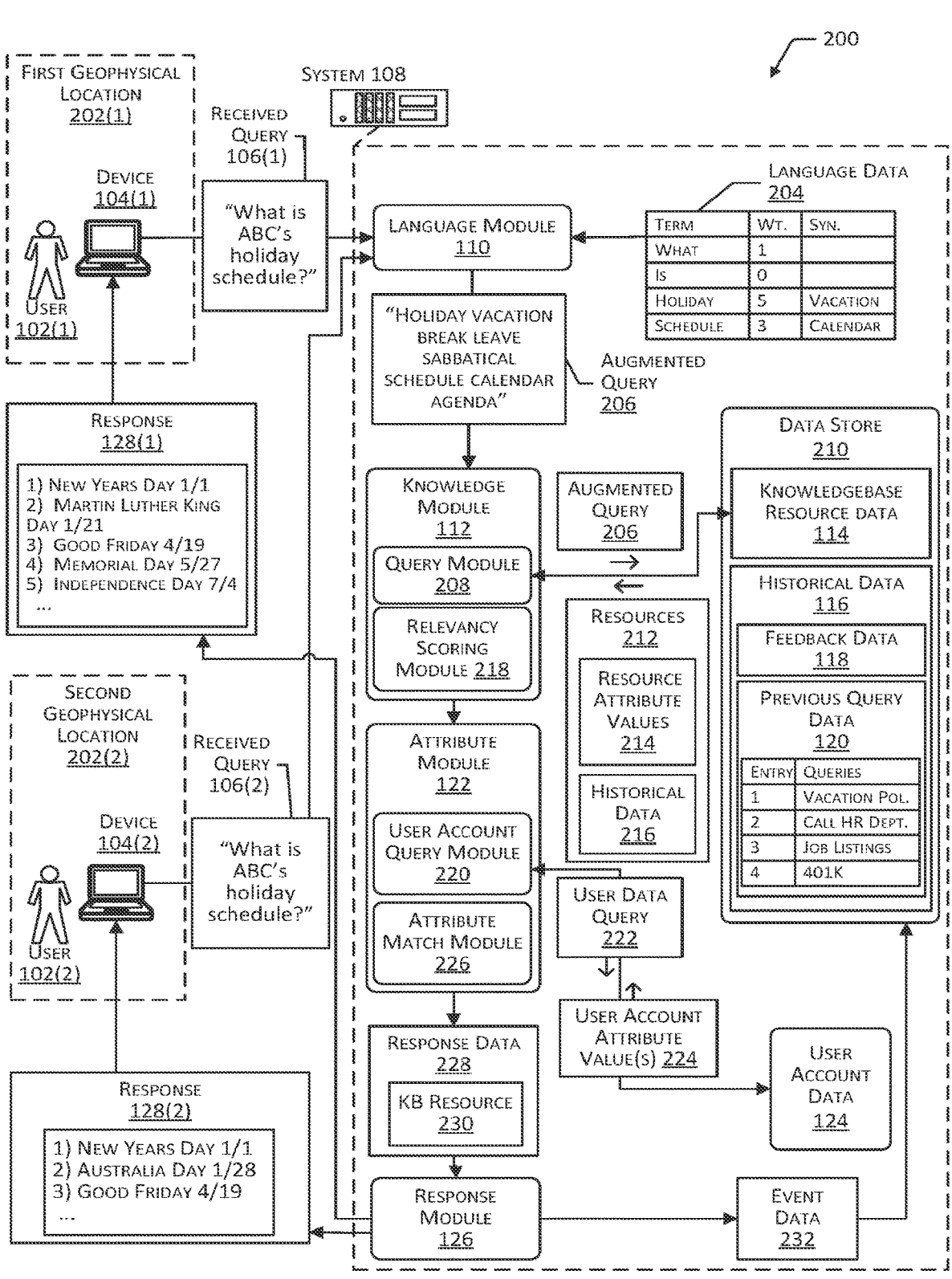
FIG. 2 depicts a block diagram of a system for determining a resource from a data store that is personalized to the user based on attribute data, according to some implementations.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Companies and other organizations may process requests for information or services from a user through various types of partially-automated systems, such as ticketing systems, or by manually processing requests. For example, an employee of a company may electronically submit a query, such as "What is ABC's holiday schedule?", or "How do I connect to the wireless network?". In some cases, the employee may submit the query, such as through e-mail or a messaging program, to a department or a particular individual associated with the company. In other cases, an employee or group of employees responsible for routing messages to appropriate departments or individuals that may address the query. In still other cases, the employee transmitting the request may select or specify a department or individual to receive the request. Periodically, a company may review the queries that were resolved during a period of time and create resources such as articles or videos that may be used to answer subsequent queries of a similar nature. In other examples, a resource may be text, images, audio, video or any combination thereof.

Embodiments of systems are described below that store resources such as text articles, audio data, videos, and so forth for an organization. During operation, the system may receive a query and may provide a response. During initial use of the system, there is little or no historical data available to help the system to determine which resource is most relevant to a particular query. For example, the system may identify two articles that seem equally relevant to terms of a query. To determine which article is the correct response for the particular user, the system may need more context information about the user than simply the text of the query. In one possible example, if there is sufficient historical data, the system may infer which of the two articles is most relevant to the user.

However, the system may not have a lot of historical data. In some instances, the system may have unbalanced historical data where the system has data about one article (thereby favoring the article) but may have little or no data about the other article. In this "cold-start" situation, the system may determine attributes associated with a user account of the user making the query. The user account attributes may include a location, a job title, a department, other parameters, or any combination thereof. The system may use the attributes of the user account to determine which article is more relevant, overcoming the "cold-start" situation by determining the article that is more relevant to the user.

The resources stored in the data store may include resource attributes. The resource attribute may specify a relevance of a particular document based on one or more of location data, job title data, department data, date information, other data, or any combination thereof. For example, wireless network login instructions (e.g., network name and security key) may be relevant in a Florida office but may be different from the wireless instructions for the Austin, Texas office. The resource attributes may specify location information, which may assist the system to determine a relevant resource from a set of resources based on a correspondence between the resource attribute and an attribute of a user account of the user that submitted the query.

In some implementations, an author of the resource or an administrator of the data store may upload the resource to the data store and may specify resource attributes associated with the resource. For example, the author may access an interface of the system to upload an article including wireless network configuration instructions and may specify a location resource attribute associated with the article that is indicative of the instructions particular to the Austin, Texas office of ABC company. Subsequently, the system may compare the user account location attribute of a first user to the location resource attribute to identify the relevant resource. In one example, the system may exclude the article from search results of a user located in the San Diego, California office. In another example, the system may determine a location attribute of a user account of the user corresponds to the Austin, Texas office, and may provide the article to the user based on the correspondence.

Over time, resources may be added to a data store of a company, may be edited to reflect changes, or may expire. For example, if a company receives numerous questions within a month regarding the process for enrolling employees in a benefits program, an individual within the company may generate a resource, such as a web page, article, or other type of data entry that explains this process. Once the resource is uploaded to the data store, subsequent queries relating to enrollment in a benefits program may be resolved by providing the resource. In this example, the system will not have any historical data available that is associated with the newly added resource to help the system to determine this new resource is most relevant to a particular query. Unbalanced historical data may tend to favor a different document. However, the author may configure one or more resource attributes for the resource, which may be used by the system to determine that the new resource is most relevant to the query.

Over time, as the system provides responses and receives feedback (positive or negative), the system accumulates historical data based on the query. The system may use the historical data by determining a correspondence or similarity between the received query and a previous query. The historical data can reinforce the relevance of a particular resource based on the correspondence between the received query and the previous query.

In some cases, similarities between a current query and one or more previous queries may not be readily apparent, depending on the particular language, grammar, or format of the query. In still other cases, a particular data entry may appear relevant to a received query, such as due to common keywords present in both the data entry and the query, but the data entry may not actually address the question presented by the user. The system may continue to utilize user attributes and document attributes to determine relevant resources.

The system may also be configured to communicate with human resources information systems (HRIS) to retrieve user account attributes, such as location attributes, department attributes, job title attributes, and so on. For example, in response to receiving a query from a first device associated with a first user, the system may utilize identifying data from the query or the first device, such as a username and password associated with the user, to retrieve attribute data associated with a user account.

Illustrative System

FIG. 1 depicts a block diagram of a system 100 for determining a resource from a data store that is personalized to the user based on attribute data, according to some implementations. The system 100 may include a device 104(1), which may be operated by a user 102(1) to send a received query 106(1) to a system 108(1). The received query 106(1) may include, for example, a request for information, one or more services, and so forth. For example, a user 102(1) within a company or other organization may access a user device 104(1) to generate the received query 106(1), which may be provided from the user device 104(1) to a system 108(1) for processing. The user device 104(1) may include any type of computing device including, without limitation, a smartphone, tablet computer, wearable computer, or other type of mobile or portable device, a desktop computer, laptop computer, or other type of personal computer, an automotive computer, a set-top box, a server, a game controller, and so forth. The system may receive the query through a messaging system, short message service (SMS), e-mail, a web portal, and so forth.

The system 108(1) may include a computer server or another computing device configured to process the received query 106(1), to determine a resource related to the query, and to provide personalized response data 128(1) in response to the query. The system 108(1) may include any number and any type of computing devices including, without limitation, the types of computing devices described with respect to the user device 104(1). The received query 106(1) may include any manner of data including, without limitation, alphanumeric data, audio data, video data, image data, and so forth, which may be input using a keyboard, touch sensor, or other input device associated with the user device 104(1). In other implementations, the received query 106(1) may be input using a microphone in conjunction with speech-to-text software or a camera or other image sensor in conjunction with optical character recognition software.

The received query 106(1) may include various parameters, such as keywords having a particular arrangement, such as a grammatical structure or format. For example, the received query 106(1) may include a question or statement expressed in natural language. The parameters of the received query 106(1) may include the particular words used in the query, the arrangement of the words, the formatting of one or more words, additional characters such as punctuation, and so forth. For example, a terminal question mark may indicate that the received query 106(1) includes a question, the presence of intermediate periods or a word containing all capital letters may indicate that one or more terms within the received query 106(1) include an abbreviation or acronym, or the presence of a capitalized word within the received query 106(1) may indicate that the particular word is a proper noun.

A language module 110(1) associated with the system 108(1) may process the received query 106(1). In some implementations, such as the system 200 in FIG. 2, the language module 110(1) may utilize language data to produce an augmented query. The language module 110(1) may provide the query or the augmented query to a knowledge module 112(1). The language module 110(1) may use natural language processing techniques to determine synonyms and other terms related to terms of the received query 106.

In some implementations, the language model 110(1) may process the received query 106(1) to determine weights for particular terms of the received query 106(1) and synonyms of particular query terms. For example, a user query may include the text "What is ABC's holiday schedule?". The system may process the user query to determine language data, which may indicate that certain terms, such as "what" and "is" are relatively unimportant for resolving the query, and thus have a weight of zero. The language data may also indicate a relatively high weight value for the terms "holiday", and "schedule" and a moderate weight value for the terms "ABC's". Additionally, the language data may indicate synonyms for one or more terms in the query. For example, the language data may indicate that synonyms for the term "holiday" may include "vacation", "break", "sabbatical", "furlough", "leave", and so forth. Similarly, the language data may indicate the synonyms "agenda", "calendar", and so forth for the term "schedule". Continuing the example, the system may process the received query to generate an augmented query, such as "holiday schedule vacation break sabbatical furlough leave calendar agenda".

The knowledge module 112(1) may use the query data from the language module 110(1) to retrieve one or more resources from knowledge base data 114(1). The one or more resources may include text data, image data, audio data, or any combination thereof. The knowledge module 112(1) may determine a text match score for each resource of the one or more resources based on text matches between terms of the query data and the augmented query and terms within each of the one or more resources.

The knowledge module 112(1) may also use the query data to retrieve historical data from a historical data store 116(1). The historical data may include previous query data 120(1) corresponding to the received query 106(1), response data related to the previous queries, and feedback data 118(1) related to the response data. The feedback data 118(1) may include positive responses, negative responses, or any combination thereof.

The knowledge module 112(1) may determine a relevancy score for each of the one or more resources based on a combination of the text match score and the historical data. For example, the knowledge module 112(1) may determine the relevancy score for a first resource and may determine negative feedback related to previous responses that provided the first resource. For example, negative feedback may indicate that the resource is not relevant to the particular query even though the text match score may be high.

In some implementations, the attribute module 122(1) or the knowledge module 112(1) may arrange the resources of the set of resources based on their respective relevancy scores. The resources may be ranked from a highest relevancy score indicative of a greatest relevancy to a lowest relevancy score indicative little relevancy to the received query 106(1). The knowledge module 112(1) may provide a set of resources and associated relevancy scores as an output.

An attribute module 122(1) may receive the output from the knowledge module 112(1). The attribute may search user account data 124(1) based on user data associated with the received query 106(1) and may receive user account attribute data in response to the user data. The attribute module 122(1) may determine a correspondence between the user account attributes and resource attributes associated with one of the set of resources. If no correspondence is determined between the user account attributes and the resource attributes, the attribute module 122(1) may provide a resource having a highest relevancy score to a response module 126(1), which may send personalized response data 128(1) to the device 104(1).

If the attribute module 122(1) determines a correspondence between the user account attributes and the resource attributes, the attribute module 122(1) may determine a subset of the set of resources based on the correspondence. For example, the received query 106(1) may relate to wireless setup information. The wireless setup information may vary from location to location. For example, each office may have a unique wireless network name and unique password information. Continuing this example, the user account attribute may indicate that the user 102(1) is a manager in the San Francisco, California office in the United States of America. The set of resources may include a first resource and a second resource. The first resource may have a high text match score and a large amount of positive feedback from being included with previous responses to queries similar to the received query 106(1). However, the user attribute data (e.g., San Francisco, California, USA) may not match the resource attributes (e.g., Chicago, Illinois office) of the first resource. The second resource may also relate to network setup information and have a high text match score but may have less feedback because it may be new. Accordingly, the second resource may appear less relevant than the first resource. However, the second resource may have a resource attribute (San Francisco, California office) that corresponds to the user attribute data. In this example, the attribute module 122(1) provides the second resource to the response module 126(1). The response module 126(1) may provide the personalized response data 128(1) to the device 104(1).

When historical data is available, the historical data from the historical data store 116(1) may be used by the knowledge module 112(1) to determine which of the resources of the set of responses. However, when the system 108(1) is first activated or when a resource has been recently added to the knowledge base data 114(1), the historical data store 116(1) may not have any previous query data 120(1) or feedback data 118(1) to inform the relevancy scores. In such a case, the attribute data may be useful to filter the resources to determine the resource for responding to the received query 106(1).

The system 108(2) includes all of the elements of the system 108(1), except that the historical data store 116(2) does not have any available data. In this example, the system 108(2) may have just been turned on or new resources may have been added to the knowledge base data 114(2). During initial use of the system, there is little or no historical data available to help the knowledge module 112(1) to determine which resource is most relevant to the received query 106. Similarly, when a new resource is added to the data store, there is little or no historical data available to help the knowledge module 112(1) to determine that the new article is most relevant to the received query 106. In such "cold-start" situations, the system 108 may use resource attributes and user account attributes to determine which resource is most relevant to the received query 106.

A user 102(2) may interact with a device 104(2) to send data to the system 108(2). The system 108(2) may include a language module 110(2) to process a received query 106(2) and to provide the received query 106(2), an augmented query, or both to a knowledge module 112(2). The knowledge module 112(2) may use query data to retrieve one or more resources from the knowledge base data 114(2). The knowledge module 112(2) may determine text match scores for each of the one or more resources. The knowledge module 112(2) may attempt to retrieve historical data from the historical data store 116(2), but there is no data available. In some implementations, the knowledge module may determine a metric associated with the historical data. The metric may include a count of historical data records, a count of a number of previous queries, an amount of time that a resource has been available, another indicator, or any combination thereof. For example, the metric may include an indication that the resource was added one day ago.

The knowledge module 112(2) may compare the metric to a threshold value. The threshold value may be indicative of little or no historical data. When the metric is below the threshold value, the knowledge module 112(2) may determine the relevancy scores for the resources without using the historical data. When the metric is equal to or greater than the threshold value, the knowledge module 112(2) may include the historical data when determining the relevancy scores. The knowledge module 112(2) may provide the set of resources and their associated relevancy scores to the attribute module 112(2).

The attribute module 112(2) may retrieve attribute data from the user account data 124(2) based on user data associated with the received query 106(2). The attribute module 122(2) may determine a resource based on a correspondence between the user account attribute data and one or more of the resource attributes of the resource. The attribute module 122(2) may provide the resource to the response module 126(2), and the response module 126(2) may provide the personalized response data 128(2) to the device 104(2). For example, when the attribute module

112(2) determines a correspondence between a resource attribute value associated with a resource of the set of resources and a user account attribute value, the attribute module 122(2) may determine the resource is most relevant to the received query 106(2).

The user attribute data may include location data, department data, job title data, other data, or any combination thereof. The correspondence between the user account attribute data and the resource attributes may be hierarchical. For example, the location data may include country data, state data, and city data. In this example of hierarchies, the specific attribute may trump the general attribute. Thus, the city data may be more determinative than the country data for the purpose of determining whether a particular resource is relevant to the user. Thus, a first resource including wireless network connection instructions for the San Francisco office may be more relevant that similar instructions in a second resource that are for the Chicago, Illinois office, though both resources may have a resource attribute indicative of the United States. Other examples are also possible.

FIG. 2 depicts a block diagram of a system 200 for determining a resource from a data store that is personalized to the user based on attribute data, according to some implementations. The system 200 may be an implementation of the system 100 of FIG. 1. In this example, the system 108 may receive the same query from two different devices 104, which may be associated with different locations, and may receive different responses based on the attribute data.

The system 108 may include the language module 110 to process a received query 106(1) from a device 104(1) associated with a first geophysical location 202(1). The device 104(1) may be associated with an office in the United States. The received query 106(1) may include, for example, a request for information, one or more services, and so forth. For example, a user 102(1) at the first geophysical location 202(1) may access the device 104(1) to generate the received query 106(1), which may be provided from the device 104(1) to the system 108 for processing. The device 104(1) may include any type of computing device including, without limitation, a smartphone, tablet computer, wearable computer, or other type of mobile or portable device, a desktop computer, laptop computer, or other type of personal computer, an automotive computer, a set-top box, a server, a game controller, and so forth. In other implementations, the device 104(1) may include multiple computing devices, or the device 104(1) may provide the received query 106(1) to one or more intermediate computing devices, access points, and so forth, which in turn provide the received query 106(1) to the system 108.

The system 108 may include any number and any type of computing devices including, without limitation, the types of computing devices described with respect to the user device 104(1). The received query 106(1) may include any manner of data including, without limitation, alphanumeric data, audio data, image data, and so forth. For example, FIG. 1 depicts the received query 106(1) including the text "What is ABC's holiday schedule?", which may be input using a keyboard, touch sensor, or other input device associated with the user device 104(1). In other implementations, the received query 106(1) may be input using a microphone in conjunction with speech-to-text software or a camera or other image sensor in conjunction with optical character recognition software.

The received query 106(1) may include various parameters, such as keywords having a particular arrangement, such as a grammatical structure or format. For example, the received query 106(1) may include a question or statement expressed in natural language. The parameters of the received query 106(1) may include the particular words used in the query, the arrangement of the words, the formatting of one or more words, additional characters such as punctuation, and so forth. For example, a terminal question mark may indicate that the received query 106(1) includes a question, the presence of intermediate periods or a word containing all capital letters may indicate that one or more terms within the received query 106(1) include an abbreviation or acronym, or the presence of a capitalized word within the received query 106(1) may indicate that the particular word is a proper noun.

The system 108 includes a language module 110 that may process the received query 106(1) using language data 204, to generate an augmented query 206. The language data 204 may associate various keywords or other parameters of queries with weight values. For example, words that are unlikely to indicate the nature of a received query 106, or words that are likely to be common to a large number of unrelated queries, such as "I", "my", "to", and "a" may be assigned a low weight value, or a weight value of zero. Continuing the example, words having a weight value of zero may be disregarded or omitted from the augmented query 206. Conversely, words that are likely to indicate the nature of the received query 106(1) or words that are less likely to be included in a large number of other queries may be assigned a high weight value. Similarly, words that are moderately likely to indicate the nature of the received query 106(1) may be assigned a moderate weight value.

As an illustrative example, FIG. 1 depicts the language data 204 assigning a weight value of "1" to the query term "What", a weight value of "0" to the query term "is", a weight value of "5" to the query term "holiday", and a weight value of "3" to the query term "schedule". Continuing the example, in the received query 106 "What is ABC's holiday schedule?", the term "is" does not identify the nature of the received query 106 and would be likely to occur in a large number of other unrelated queries, and is thus assigned a weight value of zero. The term "What" indicates that the received query 106 relates to a request for information, but the term does not indicate the nature of the received query 106 and is likely to occur in other unrelated queries. Thus, the term "What" may be assigned a weight value of one. The term "ABC" is the company name. The term ABC may be weighted when the knowledge base is shared by multiple entities and may be omitted when the knowledge base is siloed such that each company has a unique data store. The term "holiday" is highly indicative of the nature of the received query 106(1) and has a low likelihood of occurring in other queries and is thus assigned a weight value of five. The term "schedule" is moderately indicative of the nature of the received query 106(1) and is moderately likely to occur in other queries relating to meetings and other items, and is thus assigned a weight value of three. Other terms of the received query 106(1) may similarly be included in the language data 204 and associated with a weight value. Words in the received query 106(1) that are not included in the language data 204 may be assigned a default weight value. In some implementations, the arrangement, punctuation, formatting, and so forth of particular words within the received query 106(1) may also be assigned a weight value.

The language data 204 may also indicate one or more synonyms associated with keywords within the received query 106(1). For example, the language data 204 may indicate the terms "vacation", "break", "sabbatical", and "leave" may be synonyms for the term "holiday", and the terms "calendar" and "agenda" may be synonyms for the term "schedule", and so forth. When determining a response 128(1) that corresponds to the received query 106(1), the determined synonyms may also be used to locate corresponding materials for inclusion in the response 128(1). In some implementations, a single synonym may be associated with multiple words within the received query 106(1). Similarly, multiple synonyms may correspond to a single term of the query, such as the synonyms "calendar" and "agenda" for the root query term "schedule".

The augmented query 206 may be generated by removing one or more terms from the received query 106(1) that have a weight value less than a threshold value. For example, the terms "What", "Is", and so forth may have a weight value of zero, or a weight value less than a threshold value, such as three. The augmented query 206 may also include one or more of the synonyms determined to correspond to the terms of the received query 106(1). For example, in addition to the initial terms of the received query 106(1), the augmented query 206 may include the synonyms "vacation", "break", "leave", "sabbatical", "calendar", and "agenda". As a result, the initial received query 106(1) of "What is ABC's holiday schedule?" may be used to generate the augmented query 206 of "holiday vacation break leave sabbatical schedule calendar agenda". The term "ABC's" may be understood by the language module 110 to specify a particular organization. The term "ABC's" may be omitted from the augmented query 206 when the system 108 searches siloed data sources. If the system 108 searches multiple intermingled data sources, the term "ABC's" may be included together with variations of the company name. For example, the term ABC may be expanded to include the company's full name, such as "Advanced Billing and Collections" and variations thereof. In some implementations, the augmented query 206 may include additional data indicative of the weight values of each term included therein. In other implementations, the augmented query 206 may also include data indicative of other parameters of the received query 106, such as arrangements of words, capitalization, formatting, punctuation, and so forth.

The system 108 may further include a knowledge module 112 configured to receive the augmented query 206. The knowledge module 112 may include a query module 208 configured to process the augmented query 206 to search a data store 210 to determine one or more resources that may be used to generate the response 128(1) to the received query 106(1). For example, the query module 208 may retrieve one or more resources from the knowledge base resource data 114 of the data store 210. The query module 208 may also use the augmented query 206 to search historical data 116 including feedback data 118 and previous query data 120. The previous query data 120 may include data indicative of previous queries received by the system 108 as well as data related to resources that were previously provided in response to those previous queries.

For example, the query module 208 may determine common terms shared by one or more previous queries and the augmented query 206. In some implementations, the query module 208 may determine an aggregate weight value for the terms shared by each previous query and the augmented query 206 or received query 106. Based on correspondence between the previous query data 120 and the augmented query 206 or received query 106, the query module 208 may determine a particular previous query that is more similar to the augmented query 206 or received query 106 than other previous queries associated with the one or more responses.

The query module 208 may determine a metric associated with the historical data 116. When the metric is below a threshold value, the query module 208 may disregard or not utilize the historical data 116. Otherwise, the query module 208 may use the historical data in determining relevancy scores.

The knowledge module 112 may include a relevancy scoring module 218 that may determine text match scores for each of the one or more resources in the knowledge base data 212 retrieved from the data store 210. Further, the relevancy scoring module 218 may determine text match scores for each of the one or more resources. The relevancy scoring module 218 can rank the resources based on their respective text match scores. Further, the relevancy scoring module 218 may determine a total relevancy value based on a combination of the text match score and historical data 216.

The relevancy scoring module 218 may determine matches between terms of the augmented query 206 and terms of resources within the knowledge base resource data 114 of the data store 210. In some implementations, the relevancy scoring module 218 may use one or more textual match-based feature extractors (term-based similarity algorithm, semantic similarity based dot product algorithm, a synonym match algorithm, another matching algorithm, or any combination thereof). For example, one possible term-based similarity algorithm may include the Okapi BM25 algorithm, which is based on a probabilistic retrieval framework developed by Stephen E. Robertson, Karen Sparck Jones, and others and which was implemented in the Okapi Information Retrieval System at London's City University. The abbreviation "BM" stands for "Best Match". The BM25 algorithm and its newer variants (such as BM25F) represent Term-Frequency-Inverse Document Frequency algorithms, which may take into account document structure, anchor text, and other document attributes. In another example, the semantic similarity-based dot product algorithm may include the Word2Vec algorithm or similar algorithms. The Word2Vec algorithm was created by a team of researchers led by Tomas Mikolov at Google, Inc. The Word2Vec type of algorithm represents a group of related models that can be used to produce word embeddings. The models are two-layer neural networks trained to reconstruct linguistic contexts of words by taking an input of a corpus of text and producing a vector space output of multiple dimensions. The relevancy scoring module 218 may determine a text match score for each resource and then may adjust the text match score based on the historical data 216. For example, the relevancy scoring module 218 may decrease the text match score when the historical data 216 includes negative feedback for the resource to determine the relevancy score. In another example, the relevancy scoring module 218 may increase the text match score when the historical data includes positive feedback for the resource to determine the relevancy score. In some implementations, the relevancy scoring module 218 may normalize the relevancy score to a value between 0 and 1 that is indicative of a relevancy of each of the resources.

The knowledge module 112 may provide one or more resources and associated relevancy scores to the attribute module 122. The attribute module 122 may include a user account query module 220 configured to generate a user data query 222 to retrieve user account attributes 224 from the user account data 124. The user account data 124 may be part of the system 108 or may be retrieved from another system, such as a human resources information system (HRIS) through a network. The user data query 222 may include an identifier such as a username associated with a user account. The identifier may be determined from the received query 106(1). The user account attributes 224 may include one or more attributes corresponding to the user. Such attributes may include a location attribute, a job title attribute, a department attribute, or other information about a user associated with the user account.

The attribute module 122 may further include an attribute match module 226 that may determine a correspondence between the user account attributes 224 and resource attributes 214. In an example, when a resource attribute value corresponds to a user account attribute value 224, the attribute module 122 may provide the associated resource as the response data 228 including the resource 230. For example, a location attribute value (e.g., United States) from the user account attributes 224 may match a location attribute value (e.g., United States) associated with the resource attributes 214. Based on the correspondence, the attribute module 122 may determine a resource 230 that includes the location attribute value and may provide the resource 230 as the response data 228.

The system 108 may further include a response module 126 to receive the response data 228 from the attribute module 122. The response module 126 may generate a response 128(1) including data from the knowledge base resource 230. In this example, the response 128(1) includes a list of U.S. holidays, including "New Year's Day 1/1", "Martin Luther King Day 1/21", "Good Friday 4/19", "Memorial Day 5/27", "Independence Day 7/4", and so on. The response module 126 may send the response 128(1) to the device 104(1).

The system 108 may provide a different response to the same received query 106 based on the different geophysical locations associated with the user accounts. The user 102(2) accesses a device 104(2) to submit a received query 106(2) to the system 108. The received query 106(2) has the same content as the received query 106(1). In this case, the language module 110 produces the same augmented query 206. The knowledge module 112 retrieves the same knowledge base data 212 including resources, resource attributes 214, and historical data 216. The relevancy scoring module 218 may determine total relevancy scores for the retrieved resources. Further, the attribute module 122 may determine user account attributes 224(2) related to the user account of the user 102(2). In this instance, the user account attributes 224(2) may indicate a second geophysical location 202(2), such as Australia. The attribute match module 226 may determine a correspondence between the user account attributes 224(2) and the resource attributes 214 to determine a second resource 230(2), which may generate a response 128(2) including data related to the resource 230(2) to the device 104(2). In this example, the response 128(2) includes "New Year's Day 1/1", "Australia Day 1/28", "Good Friday 4/19", and so on.

While the examples described with respect to FIG. 2 included historical data 216, the correspondence between the user account attributes 224 and the resource attributes 214 may determine the resource 230. The importance of historical data 216 may be outweighed by the attribute values. In some implementations, such as when the system 108 is first activated or when a new resource is added to the data store 210, there may be no historical data 216. The knowledge module 118 may determine a metric associated with the historical data 216 and, when the metric is less than a threshold value, may disregard or not use the historical data 216. In such an example, the text match scores from the relevancy scoring module 218 may determine the relevancy scores for the resources. Further, the correspondence between the user account attribute values 224 and the resource attribute values 214 may be used to determine the resource 230.

In some instances, there may be no correspondence between the user account attribute values 224 and the resource attribute values 214. In such an example, the resource 230 may be determined based on the relevancy scores from the relevancy scoring module 218. Other implementations are also possible.

In some implementations, the attribute match module 226 may determine the correspondence between the user account attribute values 224 and the resource attribute values 214. The attribute match module 226 may combine the relevancy scores from the relevancy scoring module 218 with data indicative of the correspondence to generate total relevancy scores. In this example, the resource 230 may include a resource having a highest total relevancy score relative to other resources of the knowledge base data 212. The system 108 may provide the resource 230 having the highest relevancy score in the response data 228. Other implementations are also possible.

In some implementations, the attribute module 122 may include a machine learning module, which may be part of the attribute match module 226. In this example, the machine learning module may be configured to combine the text match scores, the historical data, and the user account attribute values 224 to determine total relevancy scores for the one or more resources. The attribute module 122 may determine a resource having a highest relevancy score and may provide the resource 230 as the response data 228. Other implementations are also possible.

FIG. 3 depicts a flow diagram 300 of a method of determining a resource that is personalized to the user based on attribute data, according to one implementation. The method may be performed by the system 108 in FIGS. 1 and 2.

At 302, a received query 106 is received at a first device (such as system 108) from a second device 104. The received query 106 may include a natural language input, audio input, image data, an ordered sequence of terms, other data, or any combination thereof.

At 304, a set of resources are determined from a data store 210 based on the received query 106, where the set of resources includes a first resource with a first resource attribute and a second resource with a second resource attribute. The set of resources may be determined by searching a data store 210 based on the received query 106. The set of resources may be retrieved based on pairwise matches between the received query 106 (or augmented query 206) and the knowledge base resource data 114 within the data store 210. The resources may include articles, documents, plain text, images, sounds, or any combination thereof.

At 306, relevancy scores are determined for the set of resources. The relevancy score may include text match scores based on a correspondence between the terms of the received query 106 and terms within the resources of the knowledge base resource data 114 within the data store 210. Further, in some instances, the relevancy score may include historical data 216 based on correspondence between terms of the received query 106 and text within the resources. Other implementations are also possible.

At 308, an attribute associated with a user account is determined based on the query. For example, an identifier, such as a username, may be used to search user account data 124 to determine one or more user account attribute values 224. The user account data 124 may be within the data store 210, within another memory, or part of another system, such as a human resources information system (HRIS).

At 310, a correspondence between the attribute 224 of the user account and resource attribute values 214 of the set of resources. In some implementations, the correspondence may be a binary value indicating a match. In other implementations, the correspondence may be determined based on a set of rules or a Boolean expression. Other implementations are also possible.

At 312, a subset of the set of resources may be determined based on the correspondence. For example, the attribute match module 226 may compare the user account attribute values 224 to the resource attribute values 214 to determine a subset of the set of resources. The subset may be comprised of resources that have a resource attribute 214 that matches a user account attribute 224. Other implementations are also possible.

At 314, a resource of the subset is determined that has a highest relevancy score. In an example, multiple resources may be identified that may have a text match score and optionally historical data, which may be used to determine the relevancy score. The relevancy scores may be compared, and the resource with the highest relevancy score may be selected.

At 316, response data including the resource is provided to the second device. For example, the system 108 may provide the response data 128 including data related to the resource (e.g., text extracted from the resource or the resource itself) to the device 104.

Figure 4:
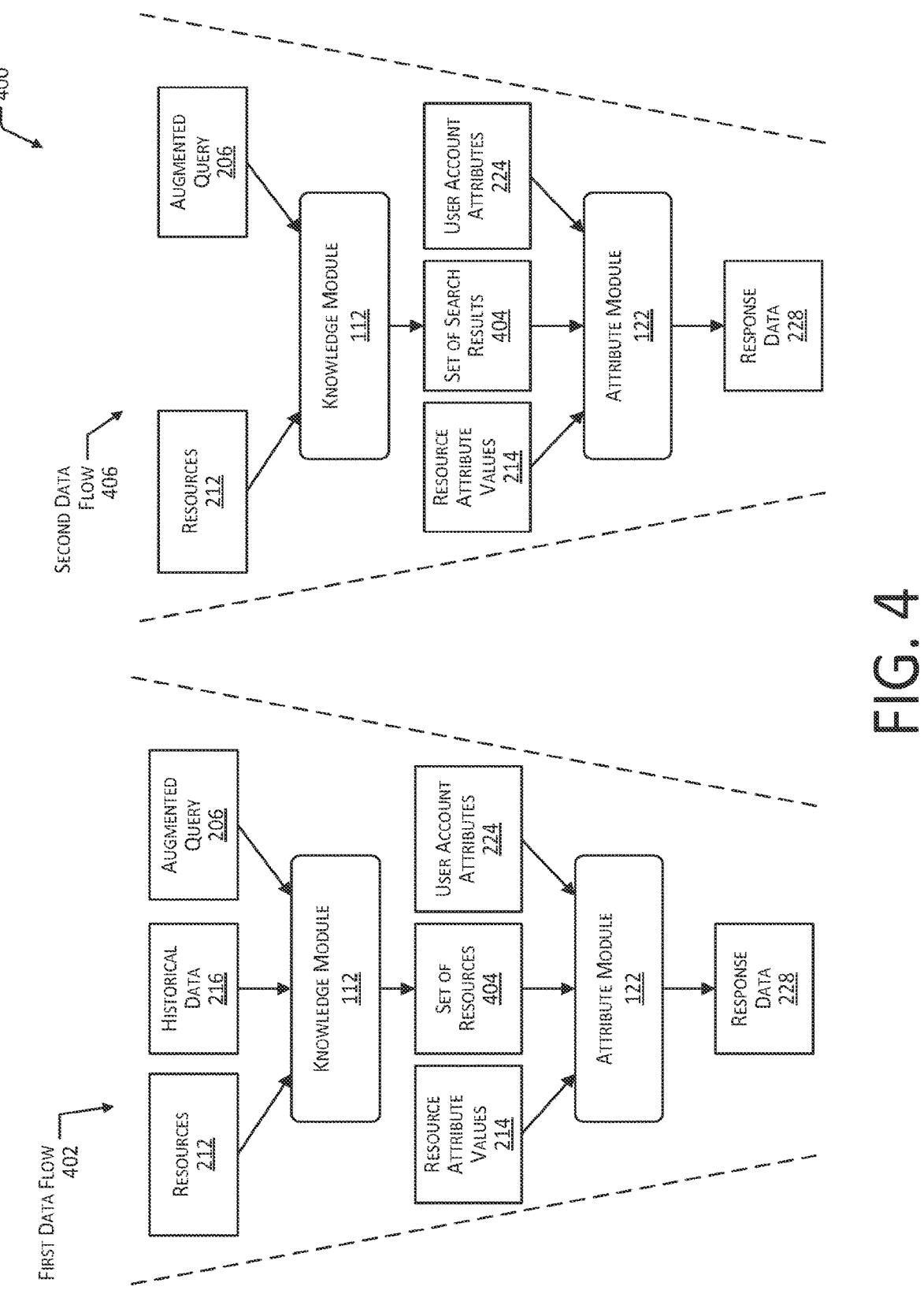
FIG. 4 depicts a block diagram of a system to determine a resource that is personalized to the user based on attribute data and with or without historical data, according to one implementation.

FIG. 4 depicts a block diagram of a system 400 to determine a resource that is personalized to the user based on attribute data and with or without historical data, according to one implementation. The system 400 depicts a first data flow 402 in which the search results are processed with historical data to determine response data 228 and a second data flow 406 in which the search results are processed without historical data 406.

In the first data flow, the knowledge module 112 receives resources 212, historical data 216, and augmented query data 206. In some implementations, the knowledge module 112 may determine a metric associated with the historical data 216 and may use the historical data 216 when the metric is greater than a threshold value. In response to the received data, the knowledge module 112 may produce a set of resources 404. The set of resources 404 may include resources determined from the data store 210. In some implementations, the set of resources 404 may include relevancy scores and resource attribute values 214. Alternatively, the knowledge module 112 may provide the resource attribute values 214 to the attribute module 122.

The first data flow 402 also includes the attribute module 122, which may receive the set of resources 404, the resource attribute values 214, and the user account attribute values 224, and may determine response data 228 based on the inputs. In an example, the response data 228 may include a resource having a resource attribute that matches one or more of the user account attribute values 224. In another example, the response data 228 may include a resource having a highest relevancy score. In still another example, the response data 228 may include a resource selected from a subset of the set of resources 404. The subset may be determined based on a match between the user account attribute values 224 and the resource attribute values 214. The resource may be selected from the subset based on the highest relevancy score. Other implementations are also possible.

In the second data flow 406, the knowledge module 112 receives the augmented query 206 and the resources 212 from the data store 210. Historical data may be unavailable. Alternatively, some historical data 216 may be received. The knowledge module 112 may determine a metric associated with the historical data 216 and may omit or otherwise disregard the historical data 216 when the metric is less than a threshold value. The threshold value maybe indicative of low or no historical data. The knowledge module 112 may determine a set of resources 404 based on the augmented query 206 and the resources 212 and may provide the set of resources 404 to the attribute module 122.

The attribute module 122 may receive response attribute values 214, the set of resources 404, and user account attribute values 224. The attribute module 122 may determine a correspondence between a first response attribute of the response attribute values 214 that is associated with one of the resources 404 and one or more of the user account attribute values 224. The attribute module 122 may determine response data 228 based on the correspondence.

The system 108 may be configured to determine response data that may be personalized to the received query 106 and to the user based on the user account attribute values 224 and without relying on historical data. By utilizing resource attribute values 214 and user account attribute values 224 to filter the set of resources 404, the system 108 can provide a personalized response that includes a resource that is responsive to the received query 106 without historical data.

The use of user account attribute values 224 and resource attribute values 214 to identify the relevant resource provides a significant advantage over prior art systems in that personalized results can be determined without the benefit of feedback or historical data, such as when the system is first made available. Further, the attribute data can be used to refine decision-making with respect to available resources, such as when new resources are introduced. Over time, the attribute data may also be used to cause a particular resource to expire so that the resource is not provided as the relevant resource after the expiration date.

Figure 5:
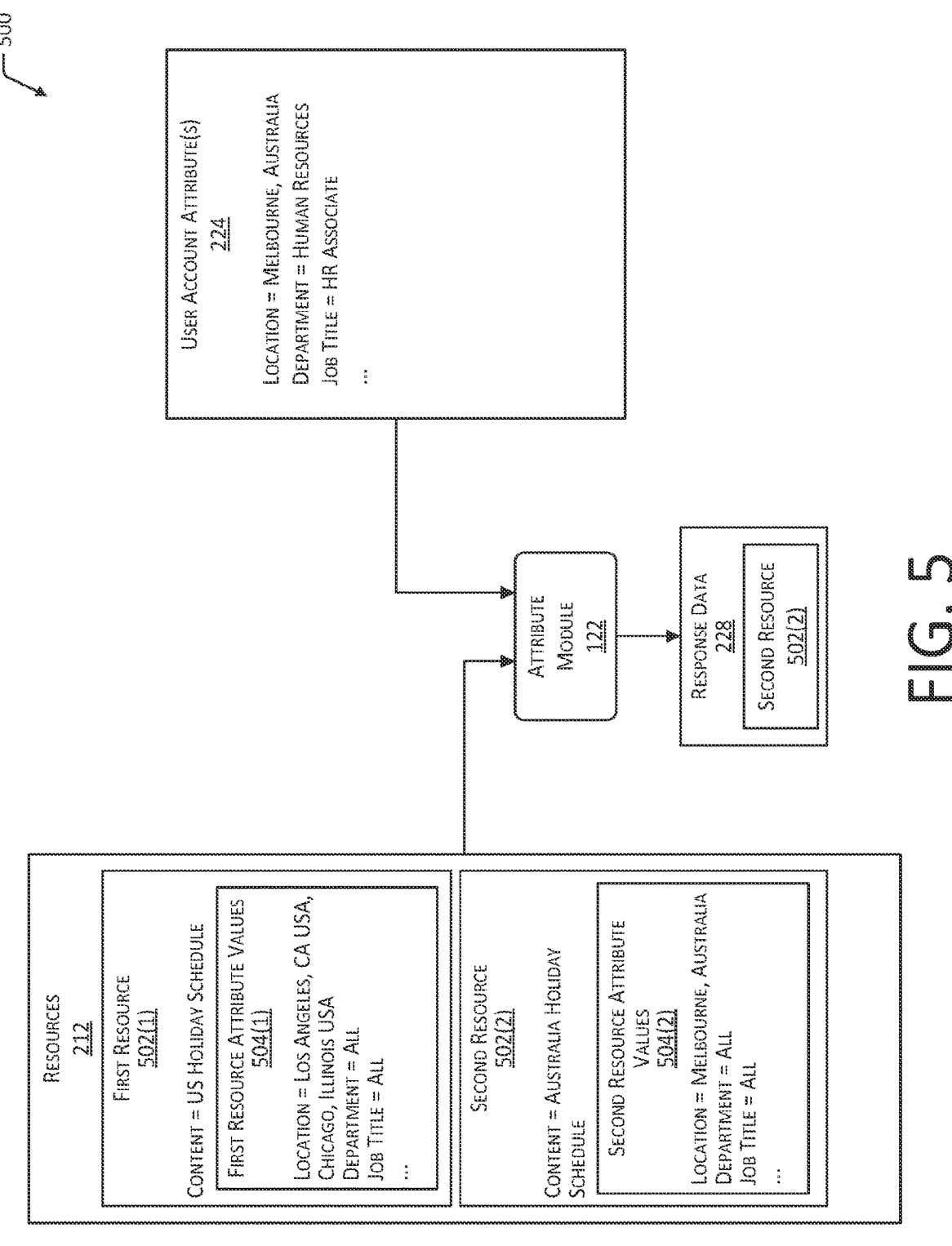
FIG. 5 depicts a block diagram of a system to determine response data including a resource based on a correspondence between resource attribute data and user account attribute data, according to one implementation.

FIG. 5 depicts a block diagram of a system 500 to determine response data including a resource based on a correspondence between resource attribute data and user account attribute data, according to one implementation. The system 500 depicts resources 212 including a first resource 502(1) with first resource attribute data 504(1) and a second resource 502(2) with second resource attribute data 504(2). The system 500 further includes one or more user account attribute values 224.

The attribute module 122 receives the resources 212 and the one or more user account attribute values 224. The attribute module 122 may determine a correspondence between the resource attribute values 504 and the user account attribute values 224.

In this example, the user account attribute values 224 may indicate a location attribute of Melbourne, Australia; a department attribute indicating human resources; and a job title attribute indicating Human Resources Associate. The first resource 502(1) may include content related to the United States holiday schedule. The first resource attribute data 504(1) may include a location attribute indicating Los Angeles, California, United States of America and Chicago, Illinois, United States of America; a department attribute indicating all departments; and a job title attribute indicating all job titles. The second resource 502(2) includes content related to the Australia holiday schedule. The second resource attribute data 504(2) may include a location attribute indicating Melbourne, Australia; a department attribute indicating all departments; and a job title attribute indicating all job titles.

The attribute module 122 may determine a correspondence between the second resource attribute values 504(2) and the user account attribute values 224. Based on this correspondence, the attribute module 122 may provide response data 228 including the second resource 502(2). In this example, the location attribute match helps to ensure that the correct resource, second resource 502(2), is provided as the response data 228. In this example, the first resource 502(1) may have more positive feedback data and may match more of the terms of the received query 106, but the attribute match information is determinative, allowing the attribute module 122 to select the second resource 502(2).

In some implementations, the correspondence between the resource attribute values 214 and the user account attribute values 224 may not be determinative. Instead, the correspondence between the resource attribute values 214 and the user account attribute values 224 may be a factor in the total relevancy score. In one example, the text match score may be normalized to a value between zero and one. The historical data may also be evaluated to produce a normalized historical value between zero and one. Additionally, the correspondence between the resource attribute values 214 and the user account attribute values 224 may provide a binary attribute score of zero or one. The total relevancy score may be determined as a sum of the text match score, the normalized historical value, and the binary attribute score. In another example, a machine learning module may combine the relevancy score, the historical data, and the correspondence data and may determine the total relevancy score based on an algorithm, on logic, or any combination thereof. Other examples are also possible.

FIG. 6 is a block diagram 600 depicting a computing device 602 within the scope of the present disclosure. The computing device 602 may include, without limitation, one or more servers, personal computers, smartphones or other mobile devices, set-top boxes, tablet computers, wearable computers, automotive computers, and so forth. For example, the computing device 602 may be an implementation of the system 108 described with regard to FIGS. 1-4. Additionally, while FIG. 6 depicts a single example computing device 602, in some implementations, computing functions described within the scope of the present disclosure may be performed by multiple computing devices 602, such as a distributed network of query servers 108 or other computing devices 602 in communication therewith. For example, a first computing device 602 may store one or more modules that may act upon data stored in a second computing device 602.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth.

The computing device 602 may include one or more communication interface(s) 610, such as input/output (I/O) interface(s) 612, network interface(s) 614, and so forth. The communication interfaces 610 may enable the computing device 602, or components of the computing device 602, to communicate with other computing devices 602 or components thereof. The I/O interface(s) 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O device(s) 616. The I/O devices 616 may include any manner of input device or output device associated with the computing device 602 or with another computing device 602 in communication therewith. For example, I/O devices 616 may include touch sensors, keyboards, mouse devices, microphones, image sensors (e.g., cameras), scanners, displays, speakers, lights, haptic devices, printers, motion sensors, location sensors, and so forth. In some implementations, the I/O device(s) 616 may be physically incorporated with the computing device 602 or may be externally placed.

The network interface(s) 614 may be configured to provide communications between the computing device 602 and other devices, such as the I/O devices 616, routers, access points, user devices 104, other computing devices 602, and so forth. The network interface(s) 614 may include devices configured to couple to one or more networks, including local area networks (LANs), wireless LANs, wide area networks (WANs), wireless WANs, and so forth. For example, the network interfaces 614 may include computing devices 602 compatible with Ethernet, Wi-Fi, Wi-Fi Direct, Bluetooth, Bluetooth Low Energy, ZigBee, Z-Wave, 3G, 4G, SG, LTE, and so forth.

The computing device 602 may include one or more busses or other internal communications hardware or software that allows for the transfer of data between the various modules and components of the computing device 602.

The computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606.

A data store 626 and one or more of the following modules may also be stored in the memory 618. The modules may be executed as foreground applications, background tasks, daemons, and so forth. The data store 626 may use a flat file, database, linked list, tree, executable code, script, or other data structure to store information. In some implementations, the data store 626 or a portion of the data store 626 may be distributed across one or more other devices including other computing devices 602, network attached storage devices, and so forth.

A communication module 622 stored in the memory 618 may be configured to establish communications with user devices 104, systems 108, or other computing devices 602. For example, the communication module 622 may be configured to receive queries 106 from devices 104 or other computing devices 602 and to provide responses 128 or other data to the devices 104 or other computing devices 602.

The memory 618 may store a graphical user interface (GUI) module 624 that may provide an interface through which a user may create resources and configure resource attribute values 214 or 504. The GUI module 624 may generate the interface including data and controls that can be accessed to view and edit existing resources, to adjust visibility and other parameters, and to upload or create new resources and configure associated resource attribute values 204 or 504.

Additionally, the memory 618 may store a language module 110. The language module 110 may be configured to determine terms of a received query 106. For example, a received query 106 may include one or more of alphanumeric data, video data, audio data, image data, or other types of data. The language module 110 may determine the types of data within the received query 106 and parameters associated with one or more types of data. For example, the language module 110 may determine particular words within a received query 106, such as by determining correspondence between alphanumeric data in the received query 106 and language data 204, which in some implementations may include dictionary data indicative of words of one or more natural languages. As another example, the language module 110 may include an optical character recognition (OCR) module configured to recognize text embedded within image data, an image recognition module configured to recognize characteristics of images, and so forth. In another example, the language module 110 may include a speech recognition, speech-to-text, or text-to-speech module configured to determine words present in audio data.

Based on the language data 204, the language module 110 may determine a weight value associated with one or more of the parameters determined in the received query 106. For example, the language data 204 may associate query parameters with corresponding weight values. Continuing the example, words within a received query 106 that are not indicative of the purpose of the received query 106 and may commonly occur in many queries may have a weight value of zero or a low weight value. For example, the terms "What", "How", and "is" may not contribute to the semantic understanding of the query. Words that are indicative of the purpose of the received query 106 and do not commonly occur within other queries may have a high weight value. The language module 110 may be configured to remove one or more parameters from the received query 106 when generating an augmented query 206. For example, query parameters having a weight value of zero or a weight value less than a threshold weight value may be omitted from the augmented query 206. In some implementations, terms that lack an associated weight value may be assigned a default weight value. In other implementations, terms that lack an associated weight value may be disregarded.

In some implementations, the language data 204 may also associate one or more synonyms with parameters of the query 106. In such cases, the language module 110 may add one or more synonyms to the received query 106 to generate the augmented query 206. The augmented query 206 may include an indication of the weight value of each parameter. In some implementations, a synonym may have a weight value equal to the weight value of the query parameter for which the synonym was determined. In other implementations, a synonym may be associated with a different weight value than that of the query parameter for which the synonym was determined.

The memory 618 may also store the knowledge module 112. The knowledge module 112 may be configured to determine correspondence between a received query 106 or an augmented query 206 and one or more resources of the knowledge base resource data 114. The knowledge module 112 may include the query module 208 and the relevancy scoring module 218. The augmented query 206 may include one or more terms, such as the synonyms determined by the language module 110 and added to the received query 106 by the language module 110 to generate the augmented query 206. Each resource of the knowledge base resource data 114 may include terms and associated resource attribute values 214, and the query module 208 may search the knowledge base resource data 114 to retrieve one or more resources related to the augmented query 206.

The knowledge module 112 may be configured to determine a subset of the knowledge base resource data 114. The subset may include one or more resources of the knowledge base resource data 114. The subset of resources may have a correspondence value between the terms of the resource and the terms of the augmented query 206 that is greater than a threshold correspondence value. In other implementations, the knowledge module 112 may be configured to determine a selected quantity of resources, such as the forty resources having the greatest correspondence values. In still other implementations, the subset of resources may be determined using a combination of threshold correspondence values. For example, the knowledge module 112 may determine the twenty resources having the greatest correspondence values, as long as each correspondence value exceeds a threshold correspondence value. In cases, where twenty of the resources do not have correspondence values that exceed the threshold correspondence value, only the resources having a correspondence value in excess of the threshold correspondence value may be included in the subset.

The knowledge module 112 may include the query module 208. The query module 208 may be configured to determine, based on the augmented query 206, the correspondence values for previous query data 120 received by the computing device 602 that are associated with the subset. For example, the knowledge module 112 may associate previous query data 120 with resources that were provided as response data 128. The query module 208 may also determine correspondence between previous query data 120 and the augmented query 206. For example, each previous query data 120 may include one or more parameters, such as words, grammatical structures, formats, images, video data, audio data, and so forth. Previous query data 120 associated with a previous query may have one or more parameters in common with the augmented query 206. Based on the weight value for each shared parameter, as indicated in the language data 204, a correspondence value for the previous query data 120 may be determined.

The knowledge module 112 may also include the relevancy scoring module 218, which may be trained using pre-labeled data, or which may be trained from an existing dataset including historical event data 232. The relevancy scoring module 218 may be configured to determine relevancy scores for one or more of the set of resources. For example, the relevancy scoring module 218 may determine a relevancy score for a resource based on the text match score between the augmented query and the resource. In some implementations, the knowledge module 118 may determine a metric associated with historical data 216, may use the historical data in the relevancy score determination when the metric is greater than or equal to a threshold value, and may disregard the historical data when the metric is less than the threshold value.

The memory 618 may include the attribute module 122, which may include the user account query module 220 and the attribute match module 226. The user account query module 220 may retrieve one or more user account attribute values 224 from the user account data 134. The attribute match module 226 may determine a correspondence between the user account attribute values 224 and a resource attribute 214 associated with one of the resources. In one implementation, the resource attribute 214 may be configured by the author to operate as a visibility attribute such that the resource is not visible unless the resource attribute corresponds to one of the user account attribute values 224. For example, if the user account attribute does not match the resource attribute, the attribute module 122 does not include the resource in the response data 228. Alternatively, the resource attribute 214 may be configured as a preference attribute, such that a relevancy score for the resource may be influenced by the correspondence between the resource attribute and the user account attribute. Other implementations are also possible.

The memory 618 may additionally store the response module 126. The response module 126 may generate response data 228 based on the resource 230, which may be determined from the data repository 210. The response data 228 may include alphanumeric data, audio data, video data, image data, or other data that may be included in the response 128, one or more formats or arrangements of data, and so forth. For example, the response data 228 may include one or more fonts, templates, styles, and so forth that may be applied to the text of the resource 230. As another example, the response data 228 may include instructional text to be provided in association with a hyperlink that may be used to access the resource. In some implementations, different response data 228 may be associated with different resources. For example, a response 128 associated with a first resource 230(1) may include the full text of the resource presented in a particular font and arrangement indicated in the response data 228. A response 128 associated with a second resource 230(2) may include instructional text and a hyperlink used to access the resource 230(2).

The memory 618 may further store one or more machine learning modules 626. In some implementations, the machine learning modules 626 may be incorporated in the attribute module 122. The machine learning modules 626 may be configured to determine the response 230 based on one or more of the text match scores, historical data, or correspondence data indicative of a correspondence between a resource attribute of a resource and a user account attribute associated with the received query 106. In one example, the machine learning module 626 may combine the text match score, the historical feedback data, and the correspondence data for each resource to determine a total relevancy score for each resource. In another example, the machine learning module 626 may selectively filter the one or more resources to determine a resource based on the correspondence data. Other implementations are also possible.

Other modules 628 may also be present in the memory 618. For example, encryption modules may be used to encrypt and decrypt communications between computing devices 602. Administrator modules may be used to modify default settings and preferences. Machine learning modules may be configured to determine relationships between queries 106 and resources and between query parameters and language data 204. Feedback modules may receive feedback data 118 and determine correspondence between the feedback data 118 and an augmented query 206.

The data store 630 may include the language data 204, which may store synonyms and weighting information for various terms. The data store 630 may also include knowledge base resource data 114, which may include resources, such as knowledge base articles and other information. The data store 630 may also include historical data 116, including previous query data 120, feedback data 118, and event data 232. The data store 630 may further include user account data 134. Further, the data store 630 may include other data 632. The other data 632 within the data store 630 may include default configurations and settings associated with computing devices 602. Other data 632 may also include security data, such as encryption keys and schema, access credentials, and so forth. Other data 632 may further include user interface content and formats, algorithms used to process and analyze feedback data 118, and so forth.

In different implementations, different computing devices 602 may have different capabilities or capacities. For example, the system 108 may have significantly more processor 606 capability and memory 618 capacity compared to the processor t06 capability and memory 608 capacity of devices 104, such as smart phones or personal computing devices. Other implementations are also possible.

Figure 7:
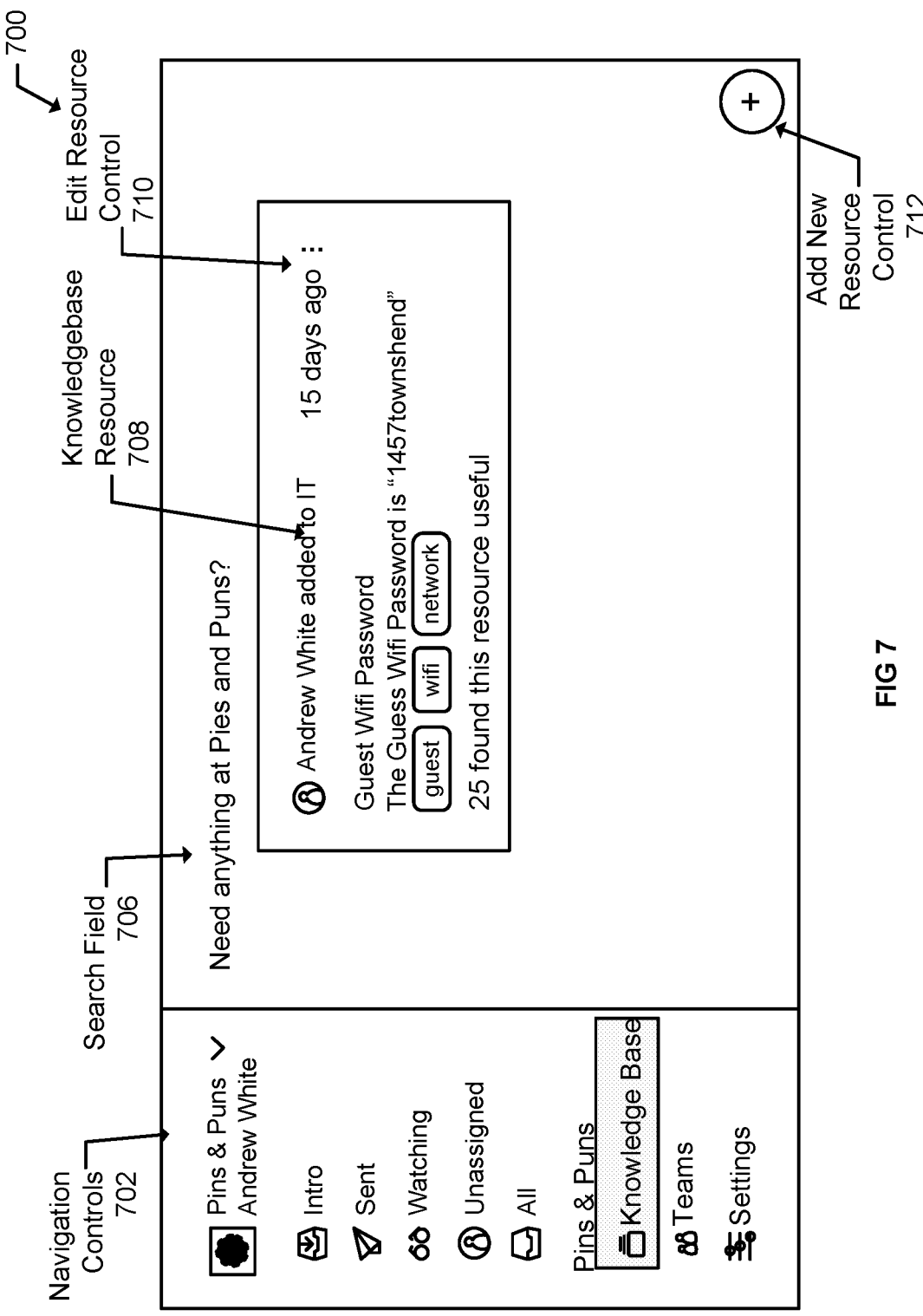
FIG. 7 depicts a graphical user interface including controls to view and edit a resource of a data store, according to one implementation.

FIG. 7 depicts a graphical user interface (GUI) 700 including controls to view and edit a resource of a data store, according to one implementation. The graphical user interface 700 may include navigation controls 702 for a particular company. In this example, the company is "Pies and Puns". The navigation controls 702 may include an inbox control accessible by the user to view one or more messages and a sent control accessible by the user to view previously sent messages. The navigation controls 702 may also include a watchdog control that may be accessed by the user to view issues requiring resolution, an unassigned control accessible by the user to view unassigned tasks, and an All inbox to view all messages and tasks. The navigation controls 702 may further include a knowledge base control, which is the activated control 704. The navigation controls 702 may also include a terms control accessible by the user to view various terms and conditions. The navigation controls 702 may also include a settings control accessible by the user to access and optionally edit one or more settings.

In the illustrated example, the GUI 700 includes a search field 706 accessible by the user to search for one or more knowledge base resources. The GUI 700 also includes a list including a knowledge base resource 708. In this example, the knowledge base resource 708 includes information related to a Guest WiFi Password. Further, the knowledge base resource 708 may include edit resource controls 710 that can be accessed by the user to edit the resource, to define resource attribute values 214, and so on.

The GUI 700 may further include an add new resource control 712, which is depicted as a circle with a plus sign. The add new resource control 712 may be accessed by the user to create or upload a resource to the system 108 and to define one or more resource attribute values 214 for the resource. In some implementations, a user may begin by selecting the add new resource control 712 and then may choose which type of resource he or she would like to add. One example is described below with respect to FIG. 8.

Figure 8:
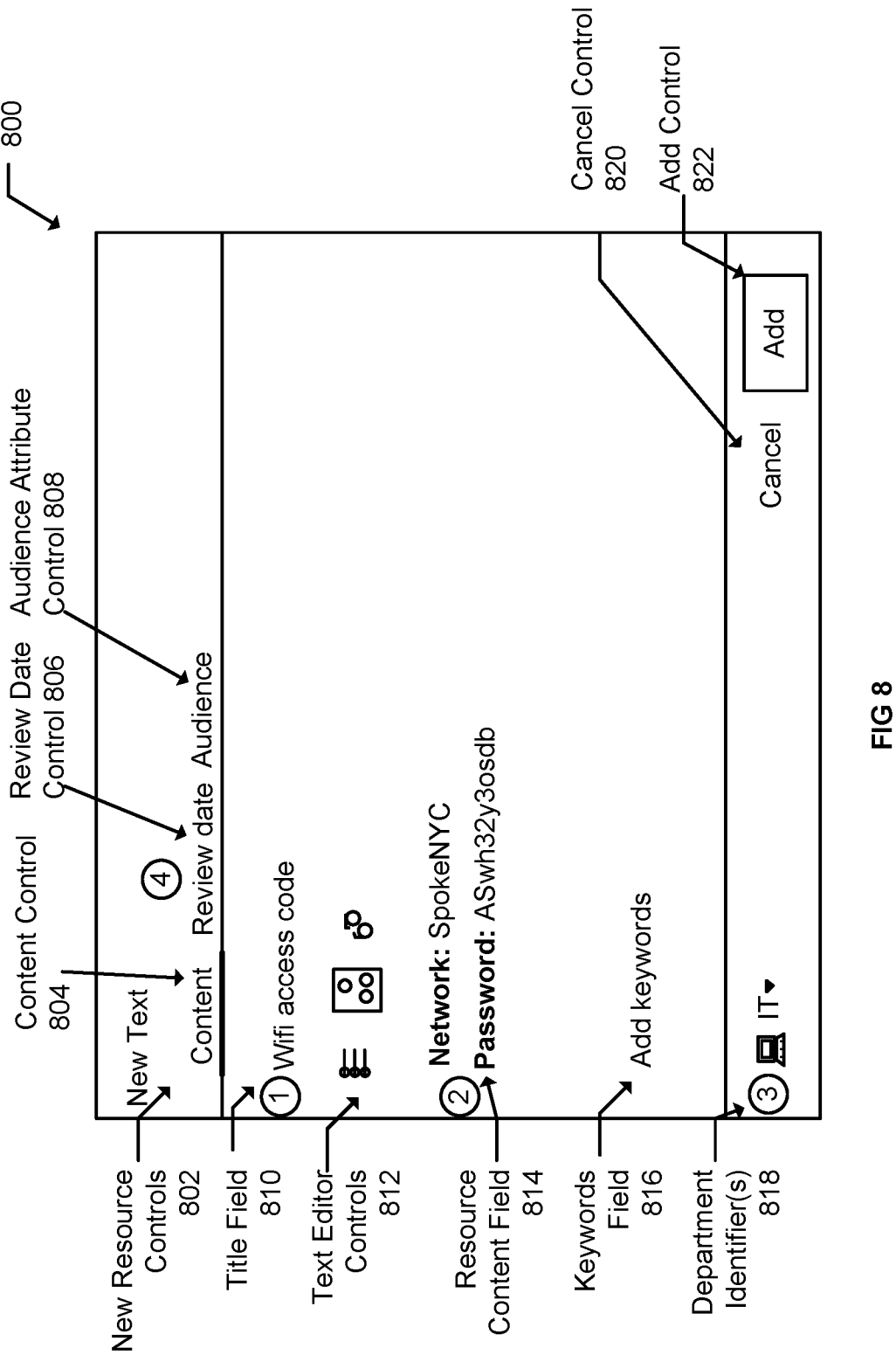
FIG. 8 depicts a graphical user interface including controls to create a new resource and to define one or more resource attributes for storage in a data store, according to one implementation.

FIG. 8 depicts a GUI 800 including controls to create a new resource and to define one or more resource attribute values 214 for storage in a data store, according to one implementation. The GUI 800 may include new resource controls 802 including a content control 804, a review date control 806, and an audience attribute control 808. In this example, the content control 804 is selected.

The GUI 800 may further include a title field 810. In this example, the user has entered "Wifi access code" in the title field 810. The GUI 800 further includes text editor controls 812 that may be accessed by the user to format the displayed text. The GUI 800 may also include a resource content field 814. In this example, the user has entered a network name "SpokeNYC" and a password "ASwh32y3osdb". The GUI 800 also includes a keyword field 816 that the user may access to enter one or more keywords. The GUI 800 may further include a department identifier control 818 accessible by the user to associate the resource with a team, such as the information technology (IT) team. The GUI 800 may also include a cancel control 820 and an add control 822. Other implementations are also possible.

Figure 9:
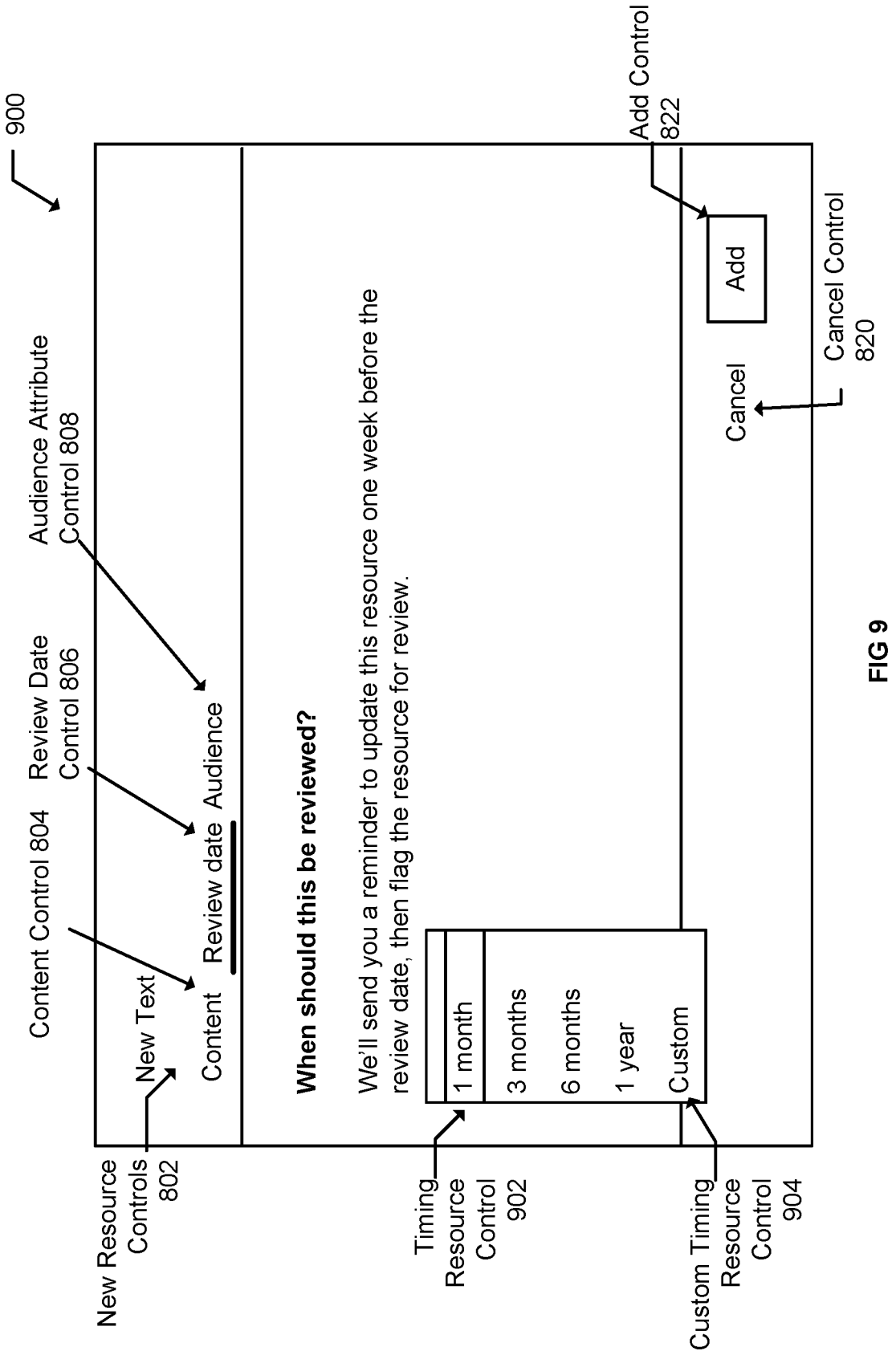
FIG. 9 depicts a graphical user interface including controls to define a review date for expiration or review of a resource in the data store, according to one implementation.

FIG. 9 depicts a GUI 900 including controls to define a review date for expiration or review of a resource in the data store, according to one implementation. The GUI 900 includes the new resource controls 802, and the review data control 806 is selected. Selection of the review data control 806 accesses a feature to enable the user to define when the resource should be reviewed for updating or deletion. For example, some knowledge base content may expire and may need to be updated periodically. For example, the holiday schedule for the year 2019 will be different from that of the year 2020 because the dates on which some of the holidays fall may vary from year to year.

The GUI 900 includes a timing resource control 902, which may be a pull-down menu accessible by the user to specify an expiration of the resource and to provide a reminder to update the resource. In this example, the review frequency of "1 month" is highlighted. The timing resource control 902 may include review timing options, such as three months, six months, one year, and so on. In this example, the timing resource control 902 may also include a custom timing resource control 904, which may be selected to configure a custom review timetable. Other implementations are also possible.

Figure 10:
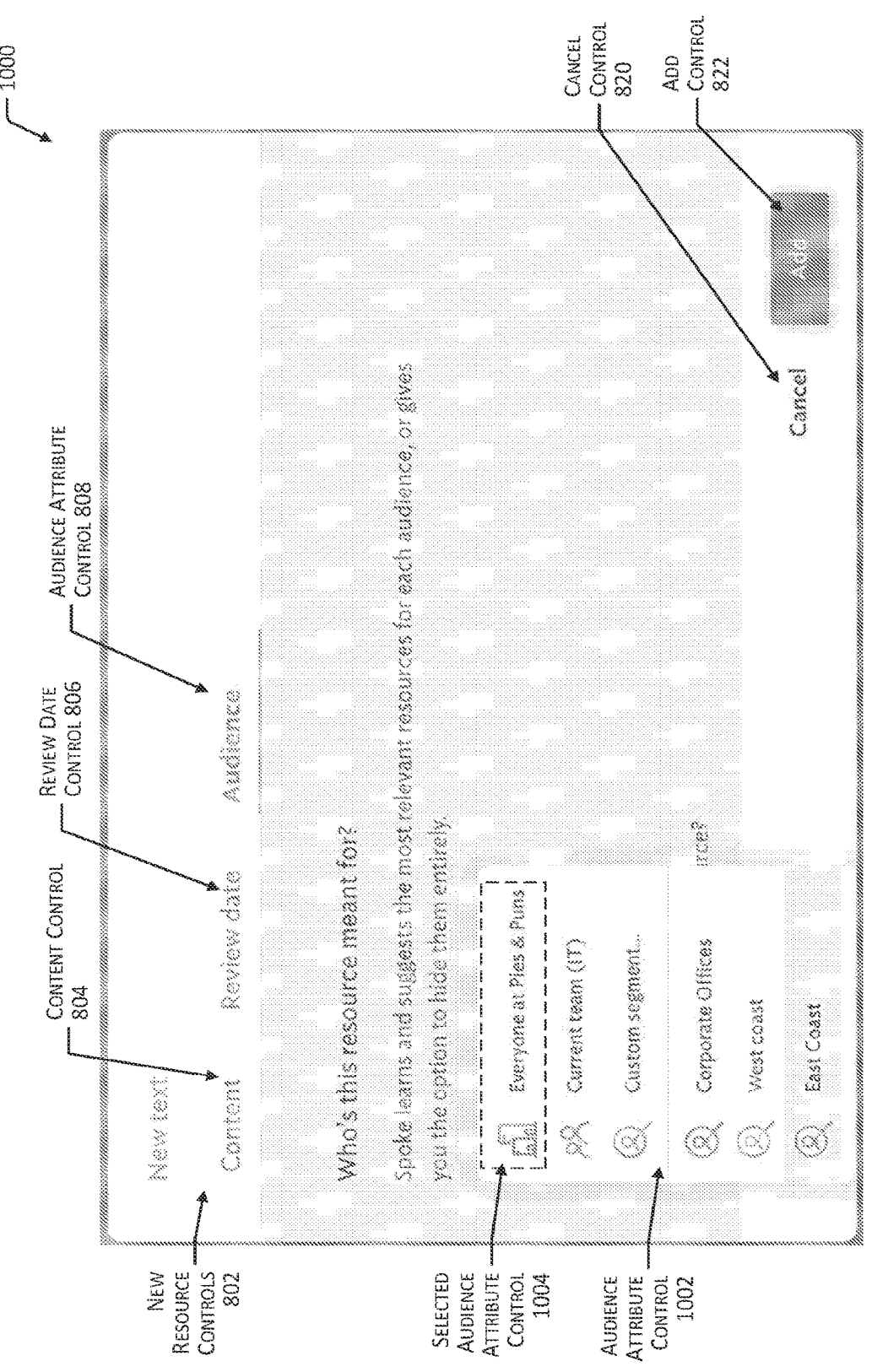
FIG. 10 depicts a graphical user interface including controls to specify an audience attribute for the resource, according to one implementation.

FIG. 10 depicts a GUI 1000 including controls to specify an audience attribute for the resource, according to one implementation. The GUI 1000 includes the new resource controls 802, and the audience attribute control 808 is selected. Selection of the audience attribute control 808 provides access to an audience attribute control 1002 accessible by the user to specify an audience for the resource. In this example, the audience attribute control 1002 may be implemented as a pull-down menu including selectable, pre-defined options, such as "Everyone at Pies & Puns", "Current team (IT)", "Corporate Offices", "West Coast", "East Cost", and so on. The audience attribute control 1002 may also include a "Custom Segment" option accessible by the user to define a custom audience attribute. In this example, the audience attribute control 1002 may include a selected audience attribute control 1004, which is "Everyone at Pies & Puns".

In this example, the resource attribute or audience attribute may be defined as all of the employees at the company. However, the audience attribute control 1002 allows for various audience segments. The audience segments may vary from implementation to implementation.

In this example, by setting the audience attribute control 1002 to indicate "Everyone at Pies & Puns", any user in the company may view this resource. Thus, this configuration does not set an audience preference. If the "Current team (IT)" control is selected, only members of the current team may view the resource. This control may be useful if teams have internal documentation or training resources that should not be visible to the whole company. Other segments are also possible.

Figure 11:
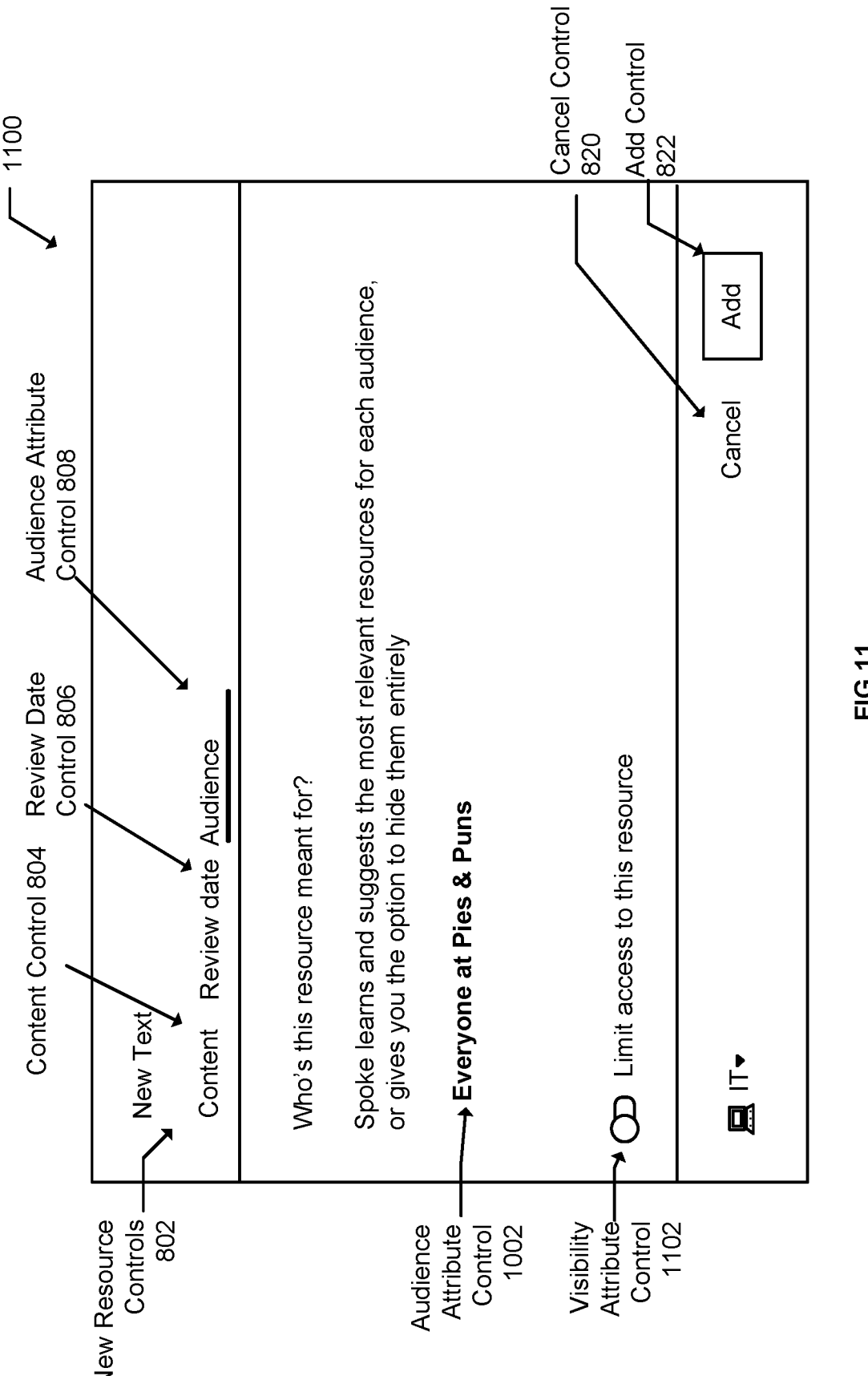
FIG. 11 depicts a graphical user interface including a control to limit access to the resource, according to one implementation.

FIG. 11 depicts a GUI 1100 including a control to limit access to the resource, according to one implementation. The GUI 1100 may include the new resource controls 802 and the audience attribute control 808 is selected.

The GUI 1100 includes a configured audience attribute control 1002. In this example, the audience attribute control 1002 is selected to be "Everyone at Pies & Puns". The GUI 1100 may further include a visibility attribute control 1102, which may be a switch or a toggle to transition between an attribute preference mode and a visibility mode. In this example, the visibility attribute control 1102 is turned off. When the visibility attribute control 1102 is turned off, the audience attribute control 1002 may be treated as a preference that may influence a total relevancy score of a resource based on a correspondence between the audience attribute control 1002 and a user account attribute 224.

The visibility attribute control 1102 may be used to limit access to the resource. In one implementation, if the resource should be restricted to the specified audience, the visibility attribute control 1102 may be turned on. In another implementation, if the resource should be preferred for the designated audience but not necessarily restricted from other audiences, the visibility attribute control 1102 may be turned off.

Figure 12:
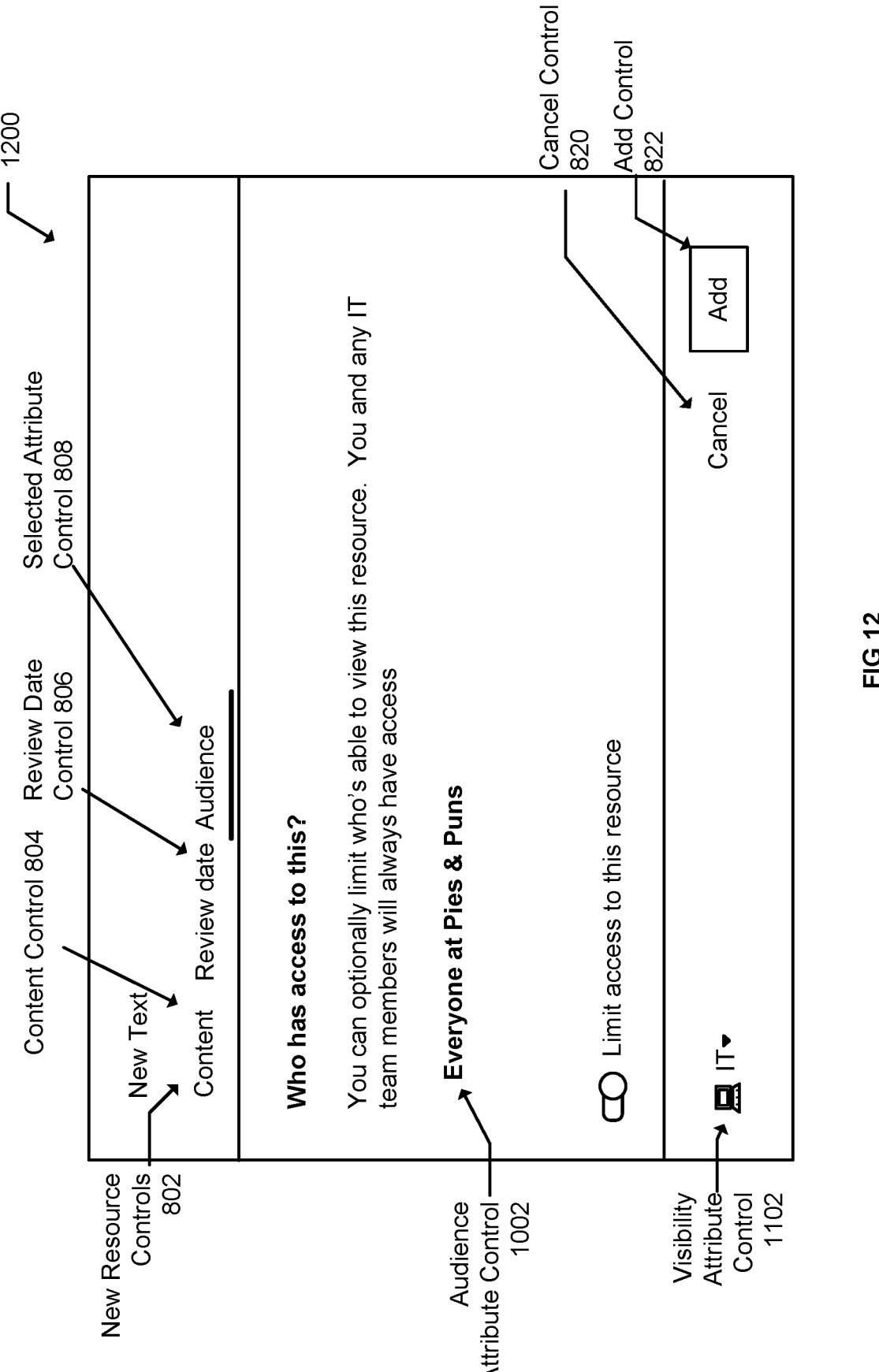
FIG. 12 depicts a graphical user interface including the control selected to limit access to the resource, according to one implementation.

FIG. 12 depicts a GUI 1200 including the visibility attribute control 1102 in an on state to limit access to the resource, according to one implementation. In this example, the visibility attribute control 1102 may change colors to indicate that it is selected. When the visibility attribute control 1102 is turned on, only the selected audience and the author may be able to view the resource.

Figure 13:
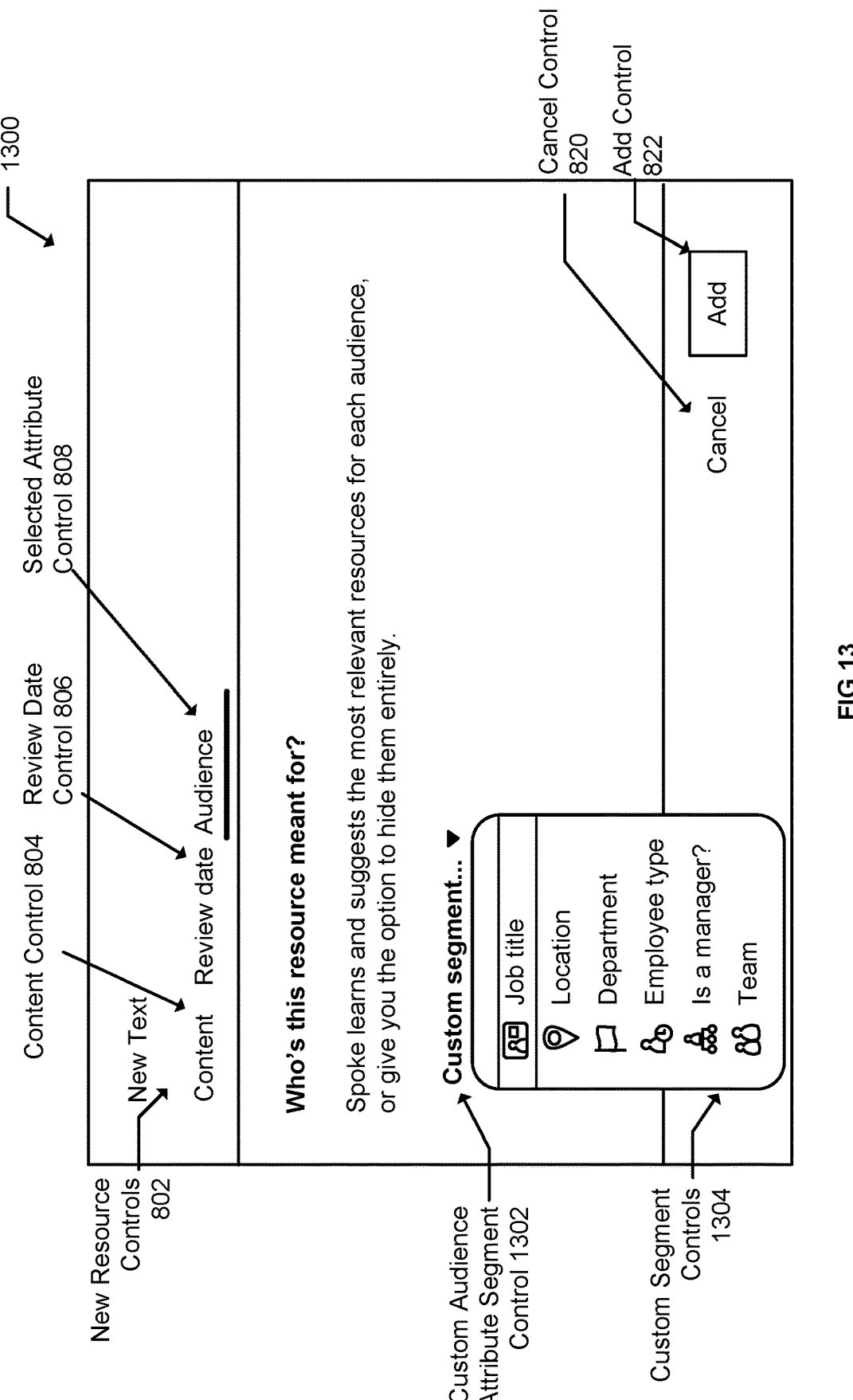
FIG. 13 depicts a graphical user interface including controls to define an audience for the resource, according to one implementation.

FIG. 13 depicts a GUI 1300 including controls to define an audience for the resource, according to one implementation. In this example, the custom audience attribute segment control 1302 may be selected. The GUI 1300 may provide custom segment controls 1304, which a user may select to customize the audience segment. The custom segment controls 1304 may include a "Job Title" control, a "Location" control, a "Department" control, an "Employee type" control, an "Is a manager?" control, "Team" control, other control options, or any combination thereof. The user may select one or more of the custom segment controls 1304 to define one or more resource attribute values 214.

When building a custom segment, attribute controls may be used individually or may be combined with other attribute controls to target the resource to a selected audience. The user may interact with the pull-down menu to build the custom segment. If a specific role needs access to information, the "job title" control may be selected. If a resource is specific to a geographic location, the "location" control may be selected, and the locations may be defined. The resource may be targeted to a department by selecting a "Department" control. In an example, the department information may be populated by human resources information systems integrations, based on imported user data, and so on. The "Is a Manager?" control may be selected to target a resource to managers, such as training and materials for managers. The "Team" control may be used to limit internal documents to members of the team. The "Employee type" control may provide different information based on the employee type (e.g., full-time, part-time, hourly, salaried, etc.).

Figure 14:
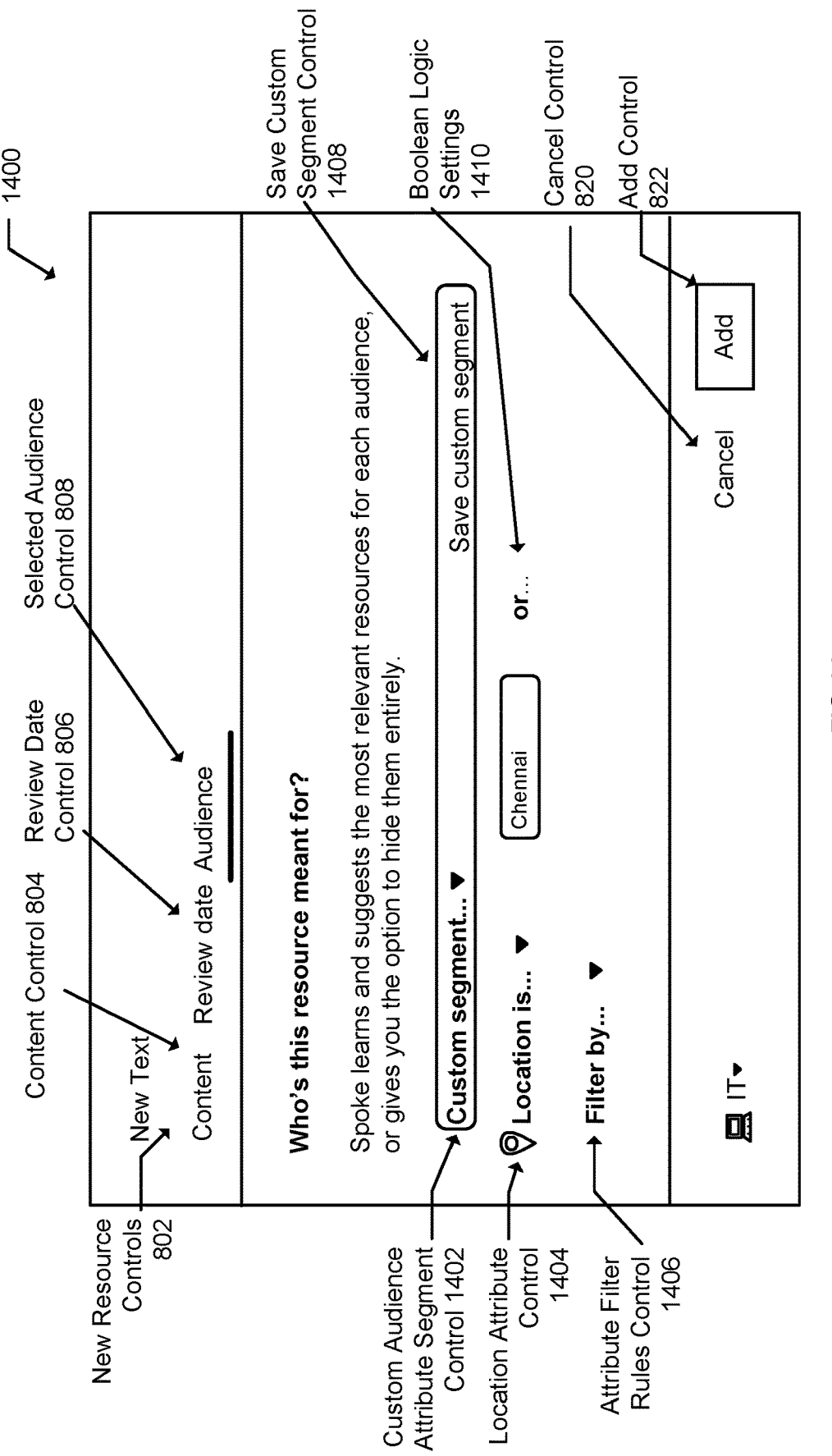
FIG. 14 depicts a graphical user interface including controls to further define the audience for the resource, according to one implementation.

FIG. 14 depicts a GUI 1400 including controls to further define the audience for the resource, according to one implementation. In this example, a custom audience attribute segment control 1402 is selected, and user has selected a location attribute control 1404 from the custom segment controls 1304 of the GUI 1300 in FIG. 13. In this example, selection of the location attribute control 1404 may cause the GUI 1400 to present a text field or a pull-down menu accessible by the user to specify the location. In this example, the user has specified "Chennai". The GUI 1400 may further include attribute filter controls 1406, which may be accessed by the user to specify one or more filters. In some implementations, the attribute filter controls 1406 may allow the user to specify Boolean logic settings 1410, such as an OR, AND, ANDNOT, and so on. The GUI 1400 may also include a save custom segment control 1408 accessible by the user to save the custom segment selections. Other implementations are also possible.

In this example, the Boolean operator enables the addition of multiple attributes, such as multiple locations that should be able to view the resource. In response to selection of the Boolean logic settings 1310, the GUI 1400 may present another text field to enter an additional attribute. To delete the filter, the user may hover the pointer over a right side of the filter to cause the GUI 1400 to display a delete control 1502.

Figure 15:
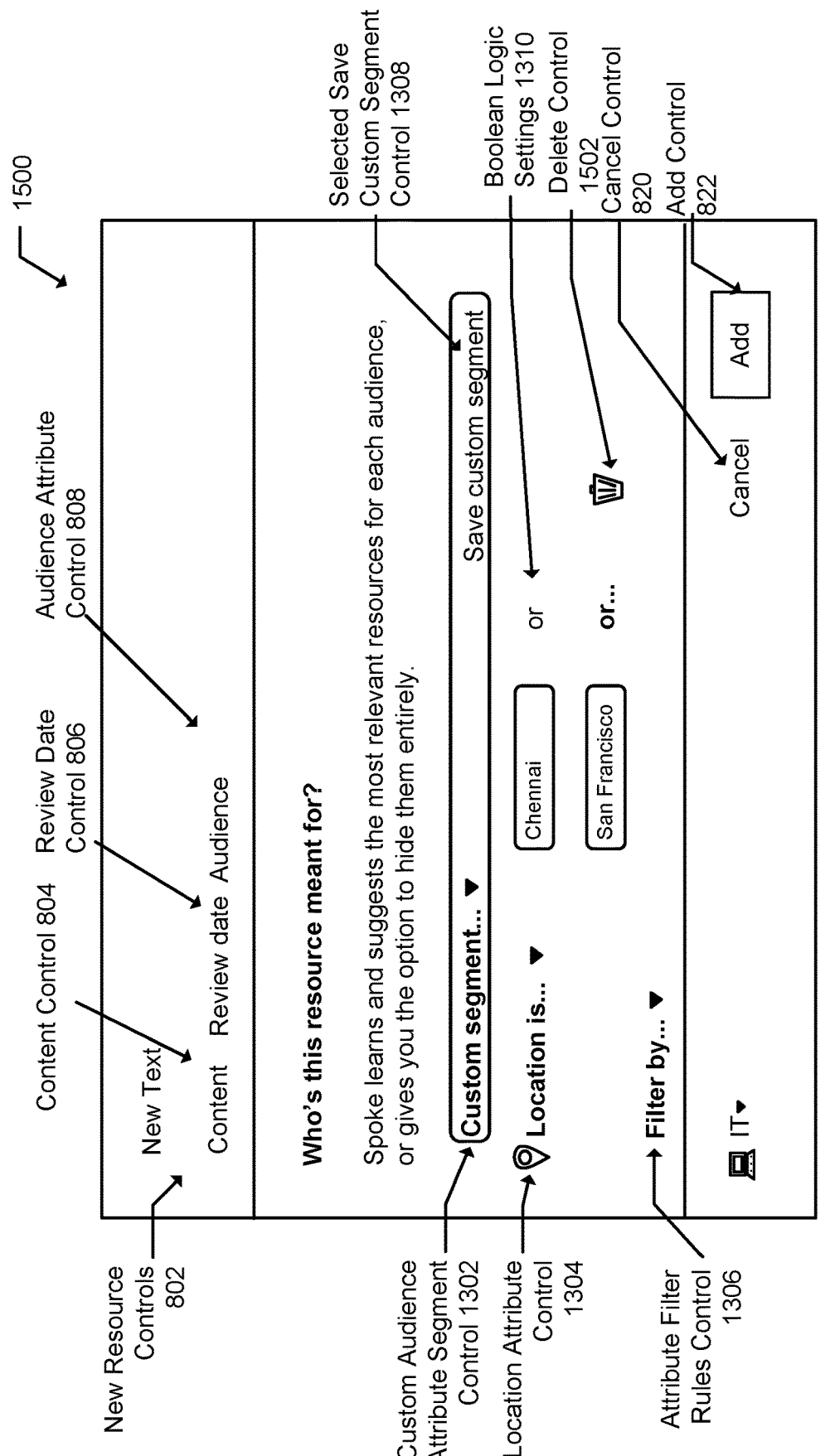
FIG. 15 depicts a graphical user interface including controls to further define the audience for the resource, according to one implementation.

FIG. 15 depicts a GUI 1500 including controls to further define the audience for the resource, according to one implementation. The GUI 1500 includes all of the elements of the GUI 1400 and further includes a second text field to add a second location. In this case, the second location is "San Francisco", and the Boolean logic settings include an OR operator. Other custom segment controls and other locations or other details may be added to further configure the resource attribute values 214. Additionally, the GUI 1500 includes a delete control 1502 accessible by the user to delete the second location.

Figure 16:
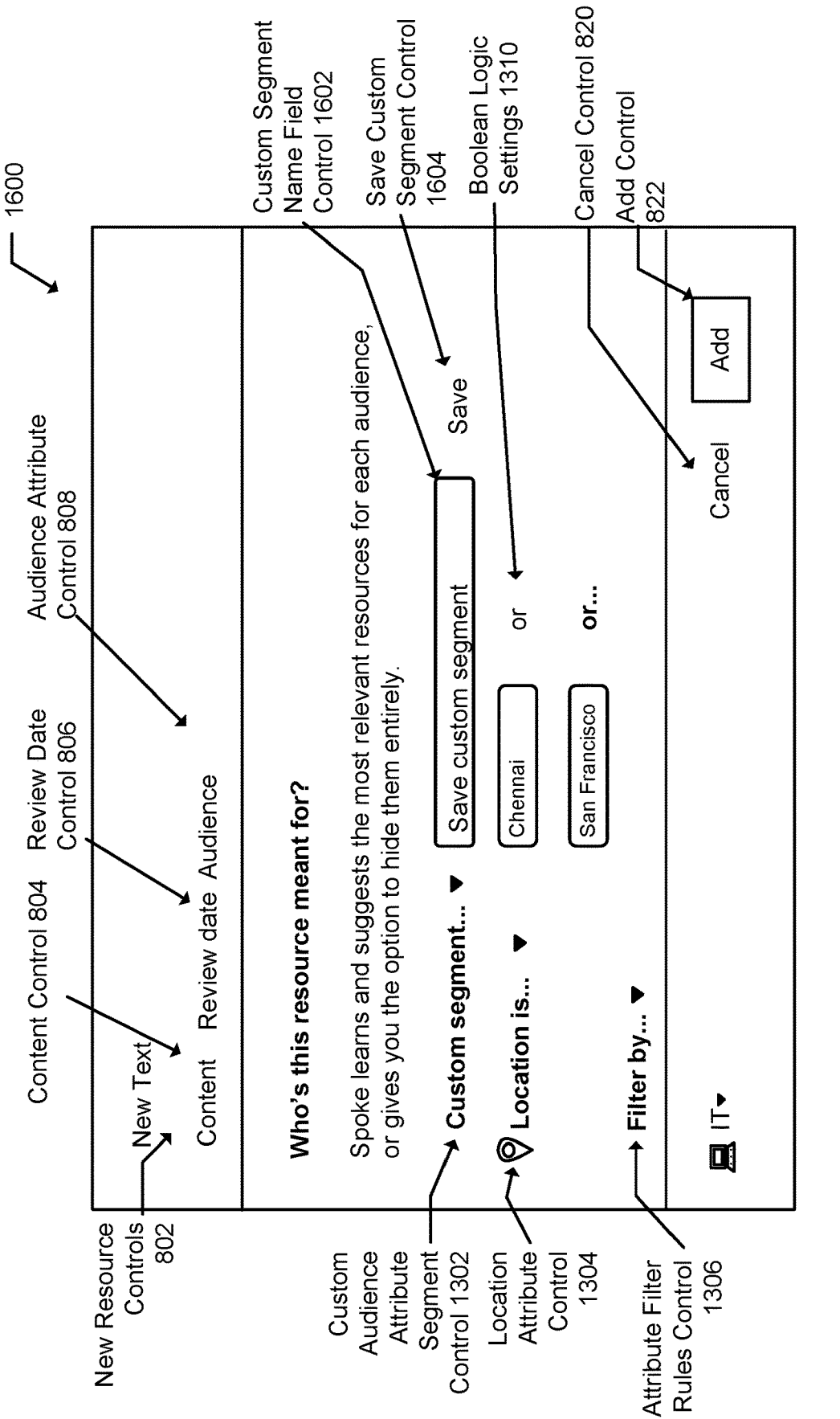
FIG. 16 depicts a graphical user interface including controls to name the audience for the resource, according to one implementation.

FIG. 16 depicts a GUI 1600 including controls to name the audience for the resource, according to one implementation. The GUI 1600 includes all of the elements of the GUI 1500 in FIG. 15. Once a custom segment is created, the custom segment may be saved for later use.

The GUI 1600 may also include a custom segment name field control 1602 accessible by the user to name the segment. In some implementations, the custom segment name may be available with respect to other resources. The GUI 1600 may further include a save custom segment control 1604 accessible by the user to save the custom segment. The user may select the Add Control 822 to add the resource to the knowledge base. Other implementations are also possible.

FIG. 17 depicts a flow diagram 1700 of a method of determining a resource from a data store that is personalized to the user based on attribute data, according to one implementation. At 1702, the same query may be received from a first device and a second device. The first device and the second device may be in different locations, may be associated with users of different departments, and so on. For example, the first device 104(1) may be a smartphone associated with a salesperson in the Chicago office, while the second device may be a desktop computer 104(2) associated with a Vice President in the New York office. Depending on the received query 106, the response 128(1) provided to the first device 104(1) may differ from the response 128(2) provided to the second device 104(2).

At 1704, a set of resources may be determined from a data store 630 based on the received queries 106(1) and 106(2).

In this example, the received query 106(1) may be the same as the received query 106(2). The language module 110 may determine an augmented query 206 based on the received query 106. The query module 208 of the knowledge module 112 may utilize the augmented query 206 to search the data store 210 to retrieve one or more resources 212 and associated resource attribute values 214.

At 1706, a first user account attribute associated with the first device and a second user account attribute associated with the second device are determined. The first user account attribute may be determined based on login information associated with the first device. The second user account attribute may be determined based on login information associated with the second device.

At 1708, a first resource from the set of resources is determined based on a correspondence between a first resource attribute and the first user account attribute. In an example, the first resource attribute may include a location attribute specifying one or more office locations of a large company. The first user account attribute may specify a location attribute associated with the user account. The first resource may be determined based on a location match between the first resource attribute and the first user account attribute.

At 1710, the first resource may be provided to the first device 104(1). For example, the response module 126 may provide a first response 128(1) including the first resource 230(1) to the first device 104(1).

At 1712, a second resource from the set of resources is determined based on a correspondence between a second resource attribute and the second user account attribute. In an example, the second resource attribute may include a different location attribute as compared to the first resource attribute.

At 1714, the second resource may be provided to the second device 104(2). For example, the response module 126 may provide a second response 128(2) including the second resource 230(2) to the second device 104(2).

FIG. 18 depicts a flow diagram 1800 of a method of determining a resource from a data store that is personalized to the user based on attribute data, according to one implementation. At 1802, a first query 106(1) is received at a first device. The first query 106(1) may include alphanumeric characters, images, audio, or any combination thereof. The first device may be the system 108.

At 1804, relevancy scores are determined based on text match data. For example, the system 108 may retrieve a set of resources from the data store 210 based on the first query 106(1) or an augmented query 206(1) based on the first query 106(1). The system 108 may determine text match scores for each of the one or more resources.

At 1806, user account attribute values 224 are retrieved that correspond to the first query 106(1). The system 108 determines user information from the first query 106(1) and retrieves user account attribute values 224 based on the user information.

At 1808, a correspondence between the user account attribute values 224 and a first resource attribute of a first resource of the set of resources. The correspondence may include a match between a location user account attribute of the user account attribute values 224 linking the user account to a geophysical location and a resource location attribute indicative of a preference for the geophysical location. In another example, the correspondence may include multiple resource attributes in a Boolean expression as compared to one or more user account attribute values 224.

At 1810, response data 228 is provided to a second device 104(2) that includes the first resource. In an example, the response data 228 including the first resource 230 may be provided to a response module 126, which may provide a response 128 to the second device 104(2). In some implementations, the response 128 may be a text message, an email message, a phone call, an audio signal, or any combination thereof.

The systems and methods described above with respect to FIGS. 1-18 use product design to solve "half" the equation in terms of providing personalization of response data. In particular, the system enables a user to create resources and to assign resource attribute values 224 to those resources. The resource attribute values 224 assist the system in determining a correct resource for responding to a received query, even in the absence of historical feedback data, such as when the system is first activated. The system may enable to the user to define the intended audience for each resource. For example, the user may upload or create a resource related to the United States Parental Leave policy and configure an associated resource attribute indicating that the policy applies to all full-time employees in the United States. By giving users a lightweight interface to define these "relevance" segments, the system 108 has solved half the problem of identifying the appropriate resource for a received query 106, since the resource attribute can be used to match to the user account attribute values 224 to determine that the resource is relevant to the user.

On the product side, the system 108 may include data integrations with human resource information systems (HRIS). These HRIS integrations provide an access to user account attribute values 224, such as the user's geophysical location, department, job title, and so on. These user account attribute values 224 can be retrieved from the HRIS and can be compared to the resource attribute to determine whether to surface the resource in response to a received query 106 from the user.

In some examples, the resource attribute may define a resource's visibility in a simple yet expressive way. An administrator or the author of the resource may configure the resource attribute values 214 to set a resource to be visible to just the managers via a graphical user interface provided by the system 108. The author or administrator may even set more complicated resource attribute values 214 through a series of rules in a Boolean expression formed from ANDs, ORs, NANDs, and other logical operators. For example, a resource related to a recruitment policy in the United States could be made visible to all users who live in San Francisco OR Denver AND belong the teams Engineering OR Human Resources.

In some implementations, the resource attribute values 214 may indicate a preference for users that have certain user account attribute values 224. Instead of making a resource invisible to certain users based on user account attribute values 224, the resource may be preferred for certain user account attribute values 224, such as by adjusting a relevancy score of the resource within a set of resources based on the correspondence between the resource attribute values 214 and the user account attribute values 224. In one implementation, the graphical user interface may include a switch or toggle accessible by the user to switch between a first mode ("preference mode") in which the correspondence between a resource attribute and a user account attribute produces a preference or a second mode ("visibility mode") in which the correspondence between the resource attribute and the user account determines whether the resource is visible to the user. The graphical user interface provides controls that can be accessed by the user to define the resource attribute values 214, specifying personalization preferences with overall very little work.

The system 108 includes an attribute module to determine the resource from a set of resources and their associated the relevancy scores without training data. In one example, the relevancy scoring may be broken into two models: 1) a text match model that produces a text match score based on word matches between the augmented query 206 and terms within the resources of a set of resources, and 2) an attribute model that determines the resource from the set of resources based in part on the correspondence between a resource attribute and a user account attribute.

The text match model, which is implemented by the knowledge module 112, may incorporate all the "messy" text match features into an overall text match score. Abstracting away all the features that go into text matching is necessary since there is no reasonable data-independent way to combine user preference with text match features without historical data. For example, it is difficult to weight user preference against token matches in titles and synonyms matches in body of a resource without feedback data. The knowledge module 112 produces a single text match score for each resource.

The attribute model may be implemented by the attribute module 122. The attribute model may determine a resource from the set of resources based on the total text match (a score that roughly indicates word-level match between the augmented query 206 and the resource), and a binary variable indicating an attribute match between the resource attribute and the user account attribute. In some implementations, the attribute model may also take into account matches between the augmented query 206 and all the positively and negatively associated previous queries associated with the resources in the set of resources. The attribute model may be trained using simulated data created by imagining different scenarios and then specifying what is the right thing to do from a good user interface perspective. Other implementations are also possible.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

receiving, from a first user at a first device, a search query comprising one or more terms;

obtaining one or more user attributes associated with the first user issuing the search query;

providing relevancy scores for content items based at least in part on word-level matches between the search query and the content items;

determining historical feedback data for previous search queries;

adjusting a value of one or more of the relevancy scores based on a correspondence between the one or more user attributes and one or more resource attributes associated with the content items and based on the historical feedback data in accordance with whether a metric of the historical feedback data satisfies a metric threshold;

in a first state where the metric of the historical feedback data fails to satisfy the metric threshold, obtaining an indication of a first content item of the content items for selection based on one or more of the relevancy scores and adjustment of one or more of the relevancy scores that is based on the correspondence between the one or more user attributes and the one or more resource attributes associated with the content items, wherein selecting the first content item in the first state is based on the metric associated with the historical feedback data failing to satisfy the metric threshold;

in a second state where a threshold amount of the historical feedback data for the previous search queries is satisfied and the metric of the historical feedback data satisfies the metric threshold, obtaining an indication of the first content item of the content items for the selection based at least in part on the historical feedback data, the value of one or more of the relevancy scores, and the adjustment of the value of one or more of the relevancy scores that is based on both the correspondence between the one or more user attributes and the one or more resource attributes associated with the content items and on the historical feedback data in accordance with the metric of the historical feedback data satisfying the metric threshold, wherein selecting the first content item in the second state is based at least in part on satisfaction of the threshold amount of the historical feedback data; and providing search results indicating the first content item.

2. The method of claim 1, further comprising:

receiving a second search query at the first device, the second search query corresponding to the search query and being associated with a second user account different from a first user account associated with the first user issuing the search query;

determining the content items based on the second search query;

determining a third user attribute value associated with the second user account;

determining a second content item from the content items based on a second correspondence between a fourth resource attribute value associated with the second content item and the third user attribute value associated with the second user account; and providing second response data including the second content item to a computing device associated with the second search query.

3. The method of claim 1, further comprising:

determining total relevancy scores for one or more content items of the content items based on a combination of the word-level matches, the historical feedback data, and the correspondence between the one or more user attributes and the one or more resource attributes associated with the content items; and determining the first content item of the content items having a highest total relevancy score;

wherein the search results include the first content item of the content items having the highest total relevancy score.

4. The method of claim 1, further comprising:

receiving a second content item at the first device;

providing an interface to a second device, the interface including at least one field accessible by a user to configure one or more resource attribute values associated with the second content item including a set of rules to determine visibility of the second content item based on user attribute values of user accounts; and storing the second content item and the one or more resource attribute values associated with the second content item in a data store.

5. The method of claim 1, wherein the first content item comprises one or more of text data, image data, video data, or audio data.

6. The method of claim 1, wherein the one or more resource attributes associated with the content items includes one or more of a location attribute, a department attribute, an employee type attribute, or a job title attribute.

7. The method of claim 1, wherein the one or more resource attributes associated with the content items includes a Boolean expression, the method further comprising evaluating the Boolean expression based on the one or more user attributes associated with the first user to determine the first content item.

8. A non-transitory computer-readable storage medium storing instructions that when executed by a computer processor perform actions comprising:

receiving, from a first user at a first device, a search query comprising one or more terms;

obtaining one or more user attributes associated with the first user issuing the search query;

providing relevancy scores for content items based at least in part on word-level matches between the search query and the content items;

determining historical feedback data for previous search queries;

adjusting a value of one or more of the relevancy scores based on a correspondence between the one or more user attributes and one or more resource attributes associated with the content items and based on the historical feedback data in accordance with whether a metric of the historical feedback data satisfies a metric threshold;

in a first state where the metric of the historical feedback data fails to satisfy the metric threshold, obtaining an indication of a first content item of the content items for selection based on one or more of the relevancy scores and adjustment of one or more of the relevancy scores that is based on the correspondence between the one or more user attributes and the one or more resource attributes associated with the content items, wherein selecting the first content item in the first state is based on the metric associated with the historical feedback data failing to satisfy the metric threshold;

in a second state where a threshold amount of the historical feedback data for the previous search queries is satisfied and the metric of the historical feedback data satisfies the metric threshold, obtaining an indication of the first content item of the content items for the selection based at least in part on the historical feedback data, the value of one or more of the relevancy scores, and the adjustment of the value of one or more of the relevancy scores that is based on both the correspondence between the one or more user attributes and the one or more resource attributes associated with the content items and on the historical feedback data in accordance with the metric of the historical feedback data satisfying the metric threshold, wherein selecting the first content item in the second state is based at least in part on satisfaction of the threshold amount of the historical feedback data; and providing search results indicating the first content item.

9. The non-transitory computer-readable storage medium of claim 8, the actions further comprising:

receiving a second search query at the first device, the second search query corresponding to the search query and being associated with a second user account different from a first user account associated with the first user issuing the search query;

determining the content items based on the second search query;

determining a third user attribute value associated with the second user account;

determining a second content item from the content items based on a second correspondence between a fourth resource attribute value associated with the second content item and the third user attribute value associated with the second user account; and providing second response data including the second content item to a computing device associated with the second search query.

10. The non-transitory computer-readable storage medium of claim 8, the actions further comprising:

determining total relevancy scores for one or more content items of the content items based on a combination of the word-level matches, the historical feedback data, and the correspondence between the one or more user attributes and the one or more resource attributes associated with the content items; and determining the first content item of the content items having a highest total relevancy score;

wherein the search results include the first content item of the content items having the highest total relevancy score.

11. The non-transitory computer-readable storage medium of claim 8, the actions further comprising:

receiving a second content item at the first device;

providing an interface to a second device, the interface including at least one field accessible by a user to configure one or more resource attribute values associated with the second content item including a set of rules to determine visibility of the second content item based on user attribute values of user accounts; and storing the second content item and the one or more resource attribute values associated with the second content item in a data store.

12. The non-transitory computer-readable storage medium of claim 8, wherein the first content item comprises one or more of text data, image data, video data, or audio data.

13. The non-transitory computer-readable storage medium of claim 8, wherein the one or more resource attributes associated with the content items includes one or more of a location attribute, a department attribute, an employee type attribute, or a job title attribute.

14. The non-transitory computer-readable storage medium of claim 8, wherein the one or more resource attributes associated with the content items includes a Boolean expression and evaluating the Boolean expression is based on the one or more user attributes associated with the first user to determine the first content item.

15. A computer system comprising:

a hardware processor; and a non-transitory computer-readable storage medium storing instructions that when executed by a computer processor to perform actions comprising:

receiving, from a first user at a first device, a search query comprising one or more terms;

obtaining one or more user attributes associated with the first user issuing the search query;

providing relevancy scores for content items based at least in part on word-level matches between the search query and the content items;

determining historical feedback data for previous search queries;

adjusting a value of one or more of the relevancy scores based on a correspondence between the one or more user attributes and one or more resource attributes associated with the content items and based on the historical feedback data in accordance with whether a metric of the historical feedback data satisfies a metric threshold;

in a first state where the metric of the historical feedback data fails to satisfy the metric threshold, obtaining an indication of a first content item of the content items for selection based on one or more of the relevancy scores and adjustment of one or more of the relevancy scores that is based on the correspondence between the one or more user attributes and the one or more resource attributes associated with the content items, wherein selecting the first content item in the first state is based on the metric associated with the historical feedback data failing to satisfy the metric threshold;

in a second state where a threshold amount of the historical feedback data for the previous search queries is satisfied and the metric of the historical feedback data satisfies the metric threshold, obtaining an indication of the first content item of the content items for the selection based at least in part on the historical feedback data, the value of one or more of the relevancy scores, and the adjustment of the value of one or more of the relevancy scores that is based on both the correspondence between the one or more user attributes and the one or more resource attributes associated with the content items and on the historical feedback data in accordance with the metric of the historical feedback data satisfying the metric threshold, wherein selecting the first content item in the second state is based at least in part on satisfaction of the threshold amount of the historical feedback data; and providing search results indicating the first content item.

16. The computer system of claim 15, the actions further comprising:

receiving a second search query at the first device, the second search query corresponding to the search query and being associated with a second user account different from a first user account associated with the first user issuing the search query;

determining the content items based on the second search query;

determining a third user attribute value associated with the second user account;

determining a second content item from the content items based on a second correspondence between a fourth resource attribute value associated with the second content item and the third user attribute value associated with the second user account; and providing second response data including the second content item to a computing device associated with the second search query.

17. The computer system of claim 15, the actions further comprising:

determining total relevancy scores for one or more content items of the content items based on a combination of the word-level matches, the historical feedback data, and the correspondence between the one or more user attributes and the one or more resource attributes associated with the content items; and determining the first content item of the content items having a highest total relevancy score;

wherein the search results include the first content item of the content items having the highest total relevancy score.

18. The computer system of claim 15, the actions further comprising:

receiving a second content item at the first device;

providing an interface to a second device, the interface including at least one field accessible by a user to configure one or more resource attribute values associated with the second content item including a set of rules to determine visibility of the second content item based on user attribute values of user accounts; and storing the second content item and the one or more resource attribute values associated with the second content item in a data store.

19. The computer system of claim 15, wherein the one or more resource attributes associated with the content items includes one or more of a location attribute, a department attribute, an employee type attribute, or a job title attribute.

20. The computer system of claim 15, wherein the one or more resource attributes associated with the content items includes a Boolean expression and evaluating the Boolean expression is based on the one or more user attributes associated with the first user to determine the first content item.

* * * * *